United States Patent
Heo et al.

(10) Patent No.: US 11,193,790 B2
(45) Date of Patent: Dec. 7, 2021

(54) METHOD AND SYSTEM FOR DETECTING CHANGES IN ROAD-LAYOUT INFORMATION

(71) Applicant: NAVER LABS CORPORATION, Seongnam-si (KR)

(72) Inventors: Minhyeok Heo, Seongnam-si (KR); Sujung Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 0 days.

(21) Appl. No.: 17/225,344

(22) Filed: Apr. 8, 2021

(65) Prior Publication Data
US 2021/0333124 A1 Oct. 28, 2021

(30) Foreign Application Priority Data

Apr. 28, 2020 (KR) .................. 10-2020-0051754

(51) Int. Cl.
*G01C 21/00* (2006.01)
*G08G 1/0968* (2006.01)

(52) U.S. Cl.
CPC ..... *G01C 21/3859* (2020.08); *G01C 21/3815* (2020.08); *G01C 21/3874* (2020.08); *G08G 1/096844* (2013.01)

(58) Field of Classification Search
CPC ............ G01C 21/3715; G01C 21/3874; G01C 21/3859; G08G 1/096844
See application file for complete search history.

(56) References Cited

U.S. PATENT DOCUMENTS

| 8,880,273 | B1 | 11/2014 | Chatham | |
|---|---|---|---|---|
| 2006/0228000 | A1* | 10/2006 | Miyajima | G06K 9/00798 382/104 |
| 2019/0065863 | A1* | 2/2019 | Luo | G06K 9/6267 |
| 2019/0113925 | A1 | 4/2019 | Sim | |
| 2019/0271780 | A1 | 9/2019 | Bravo Orellana et al. | |
| 2020/0088538 | A1* | 3/2020 | Sekiyama | G06T 7/20 |
| 2020/0167603 | A1* | 5/2020 | Ung | G06T 7/70 |
| 2020/0182631 | A1* | 6/2020 | Yang | G01C 21/3492 |

FOREIGN PATENT DOCUMENTS

| JP | 2005337863 A | 12/2005 |
|---|---|---|
| KR | 1020120079341 A | 7/2012 |
| KR | 101492929 B1 | 2/2015 |
| KR | 1020160062261 A | 6/2016 |
| KR | 101941499 B1 | 1/2019 |
| KR | 1020190042205 A | 4/2019 |
| KR | 1020190082291 A | 7/2019 |
| KR | 1020190090999 A | 8/2019 |

OTHER PUBLICATIONS

Office action issued in Korean patent application No. 10-2020-0051754, dated Sep. 20, 2020 (with translation).

* cited by examiner

*Primary Examiner* — Aaron L Troost
(74) *Attorney, Agent, or Firm* — Greer Burns & Crain Ltd.

(57) ABSTRACT

A method for detecting changes in road information includes converting a captured road image and a projected road-layout map into first intermediate data and second intermediate data of a same feature space, respectively, and calculating the similarity between the captured road image and the projected road-layout map based on the first intermediate data and the second intermediate data Thereafter, the presence or the absence of changes in road information on the projected road-layout map is detected based on the calculated similarity.

17 Claims, 13 Drawing Sheets

1300

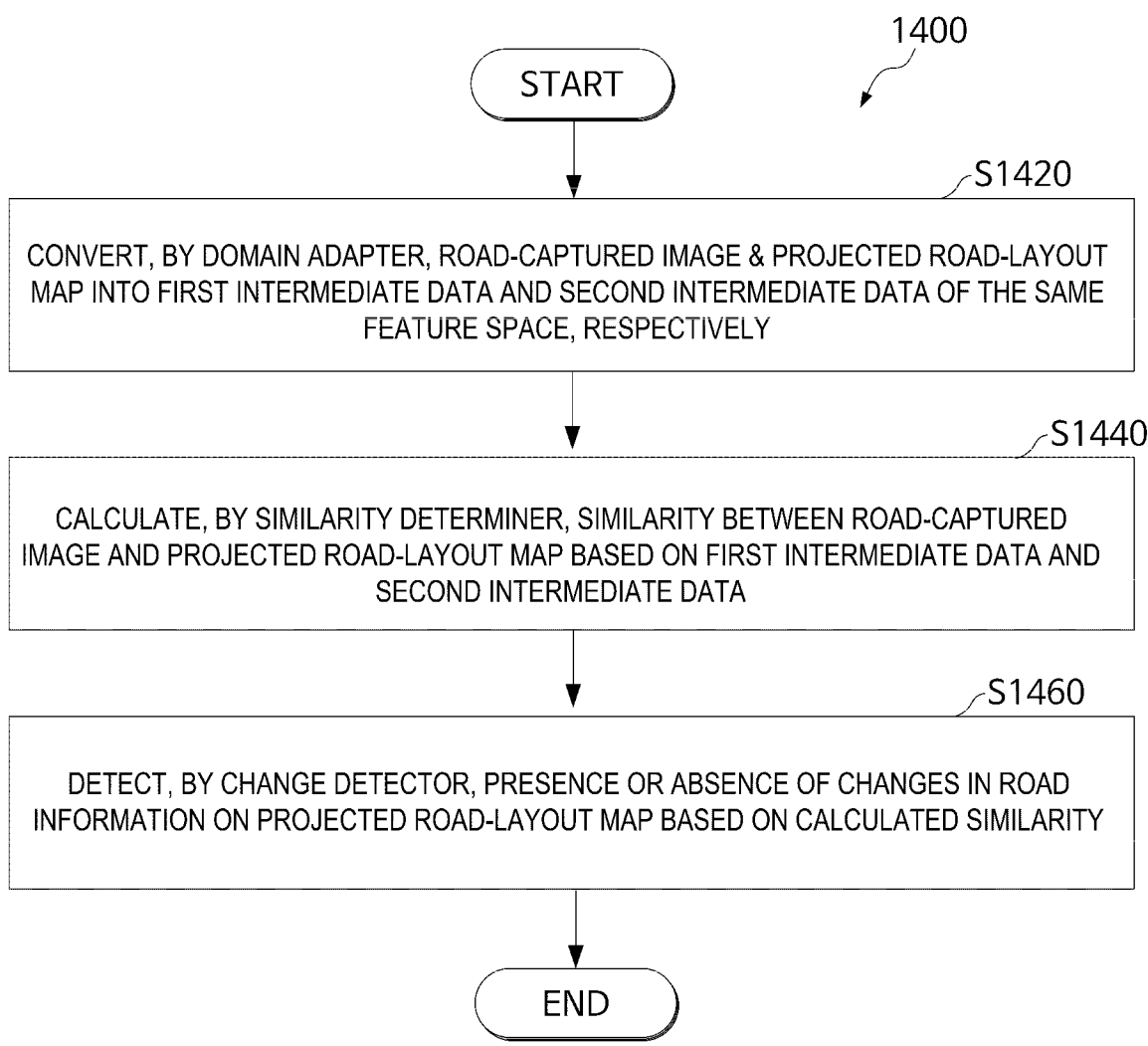

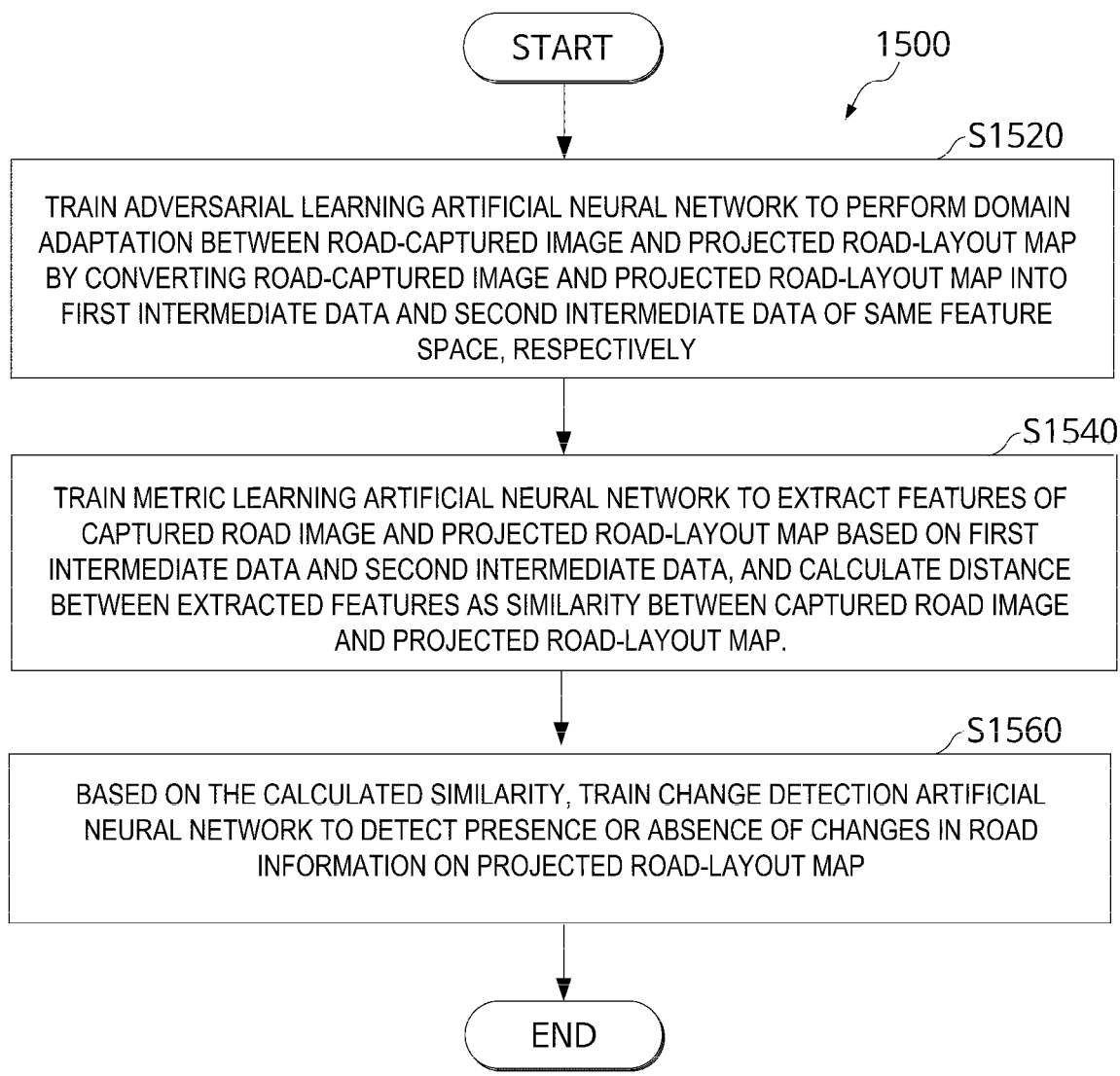

METHOD AND SYSTEM FOR DETECTING CHANGES IN ROAD-LAYOUT INFORMATION

CROSS-REFERENCE TO RELATED APPLICATION

This application claims priority under 35 U.S.C § 119 to Korean Patent Application No. 10-2020-0051754, filed in the Korean Intellectual Property Office on Apr. 28, 2020, the entire contents of which are hereby incorporated by reference.

BACKGROUND OF THE INVENTION

Field of Invention

The present disclosure relates to a method and system for detecting changes in road information, and more specifically, to a method and system for sensing or detecting whether or not there are changes in road information included in a high-definition map using a high-definition map and a captured road image.

Description of Related Art

In recent years, as interest and importance of autonomous driving vehicles or road driving information increases, construction of high-definition (HD) maps or road-layout maps including information necessary for the vehicle to travel, such as road lanes, road markers, and the like is in progress. In general, the road-layout maps are produced using high-definition aerial photographs, and the road-layout maps are generated and stored in the form of vector data by extracting information on necessary road or structure from the aerial photographs.

Since the accuracy of the road-layout map is determined by whether or not the current road status or information is reflected, the road-layout map needs to be kept up-to-date by rapidly detecting and correcting changes in road lanes, road markers, and the like represented on the map. However, periodically acquiring high-definition aerial photographs to detect changes that may occur at any time on the road-layout map is inefficient when considering high cost. In addition, even when the aerial photographs are acquired, it is difficult to detect a change by directly comparing the aerial photograph stored in the form of an image with the road-layout map previously stored in the form of vector data.

Meanwhile, the related algorithms for detecting changes in images or data require that the data to be compared be expressed as data pairs arranged in the same form. In addition, among these change detection algorithms, algorithms developed to detect the changes in road information of high-definition maps stored in an electronic format also require a combination of expensive and various sensors to collect data to be compared, and can be applied only to predefined road information. Therefore, there is a problem in that it is difficult to detect a change by directly inputting a previously stored road-layout map and a newly acquired aerial photograph into a change detection algorithm without pre-processing.

BRIEF SUMMARY OF THE INVENTION

The present disclosure is designed to solve the problems described above, and provides a method and system for sensing and detecting changes in road information on a road-layout map through a road image captured using a low-cost camera rather than an expensive aerial photograph.

The present disclosure provides a method and system for sensing and detecting changes in road information without a pre-processing process of aligning or converting the data in analyzing and comparing a road-layout map stored in the form of vector data with a captured road image in another data format.

In addition, the present disclosure provides a method and system for comparing information of a previously stored road-layout map with a currently captured road image to detect and display a region where a change occurs on the corresponding map.

The present disclosure may be implemented in a variety of ways, including a method, a system, a device, or a computer program stored in a non-transitory computer-readable recording medium.

The method for detecting changes in road information performed by at least one processor of a computer system according to an embodiment is provided. The method includes: converting, by a domain adapter, a captured road image and a projected road-layout map into first intermediate data and second intermediate data of a same feature space, respectively, calculating, by a similarity determiner, a similarity between the captured road image and the projected road-layout map based on the first intermediate data and the second intermediate data, and detecting, by a change detector, presence or absence of changes in road information on the projected road-layout map based on the calculated similarity.

A method for training an artificial neural network for detecting changes in road information performed by at least one processor of a computer system according to another embodiment is provided. The method includes training an adversarial learning artificial neural network to perform domain adaptation between a captured road image and a projected road-layout map by converting the captured road image and the projected road-layout map into first intermediate data and second intermediate data of a same feature space, respectively, training a metric learning artificial neural network to extract features of the captured road image and the projected road-layout map based on the first intermediate data and the second intermediate data, and calculate a distance between the extracted features as a similarity between the captured road image and the projected road-layout map, and training a change detection artificial neural network to detect presence or absence of changes in road information on the projected road-layout map based on the calculated similarity.

According to another embodiment, there is provided a non-transitory computer-readable recording medium storing instructions for executing, on a computer, the method for detecting changes in road information or the method for training an artificial neural network for detecting changes in road information described above.

A system for detecting changes in road information according to another embodiment is provided. The system includes a domain adapter configured to convert a captured road image and a projected road-layout map into first intermediate data and second intermediate data of a same feature space, respectively, to perform domain adaptation between the captured road image or the projected road-layout map, a similarity determiner configured to calculate a similarity between the captured road image and the projected road-layout map based on the first intermediate data and the second intermediate data, and a change detector configured to detect presence or absence of changes in road information on the projected road-layout map based on the calculated similarity.

According to some embodiments, it is possible to detect the presence or absence of changes in road information on the road-layout map based on the image captured by the camera that is available at a relatively low cost compared to a high-definition aerial photograph.

According to some embodiments, by detecting a difference between the projected road-layout map and the image captured by a camera, it is possible to automatically detect a region where a change occurs in road information on the road-layout map. By correcting the road information on the road-layout map according to the detected changes in road information as described above, it is possible to maintain the up-to-dateness of the road-layout map at low cost.

According to some embodiments, in order to sense or detect changes in road information on the road-layout map, it is not necessary to perform a separate pre-processing process such as aligning data to be compared with the road-layout map or converting the form of data. Accordingly, by simply inputting a road image captured by a camera and the road-layout map of a corresponding location, the presence or absence of changes in road information and a region of such changes in the road information can be easily sensed or detected.

According to some embodiments, it is possible to artificially generate the data needed to train an artificial neural network for detecting changes in road information on the road-layout map. Therefore, when it is difficult to acquire a dataset with actual changes in road information, such as a high-definition map, it is possible to solve a problem of difficulty of training the artificial neural network to detect the changes in road information. Further, since it is possible to train the artificial neural network using data including various artificially generated changes in road information, the performance of artificial neural networks can be further enhanced in detecting changes in road information on the road-layout map.

BRIEF DESCRIPTION OF THE DRAWINGS

Embodiments of the present disclosure will be described with reference to the accompanying drawings described below, where similar reference numerals indicate similar elements, but are not limited thereto, in which:

FIG. 14 is a flowchart illustrating a method for detecting changes in road information according to an embodiment; and FIG. 15 is a flowchart illustrating a method for training an artificial neural network for detecting changes in road information according to an embodiment.

DETAILED DESCRIPTION OF THE INVENTION

Figure 1:
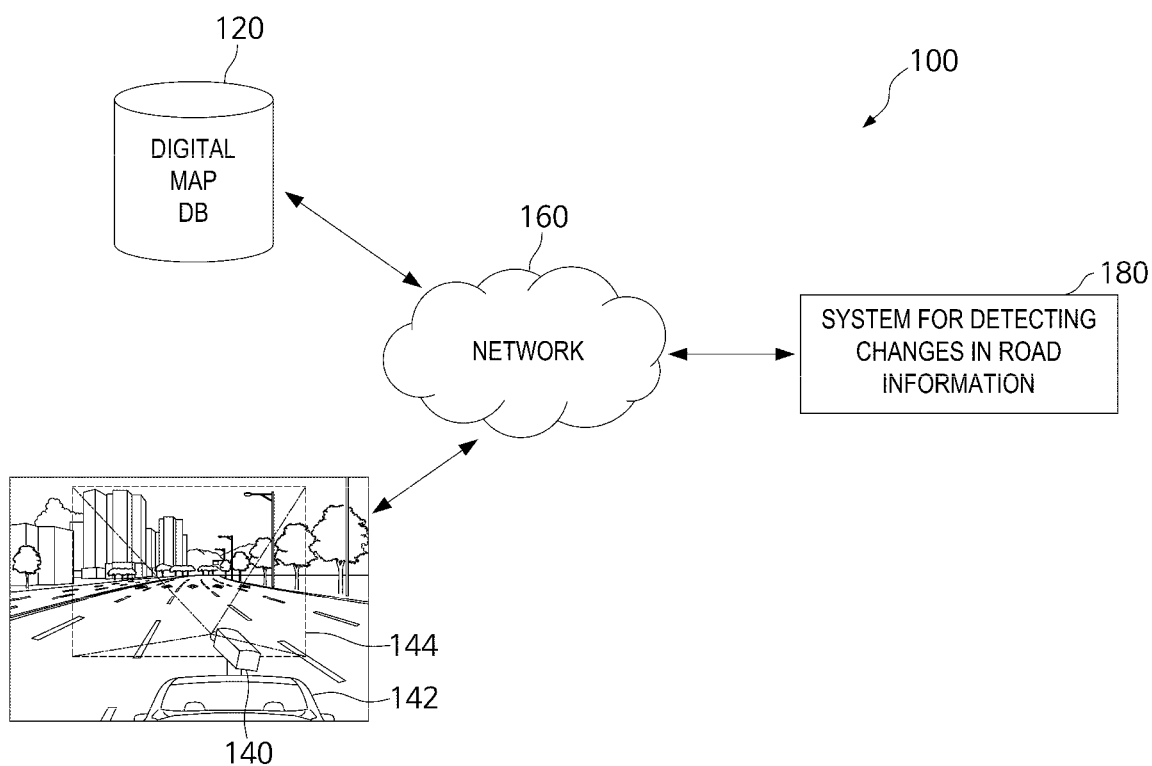
FIG. 1 is a schematic diagram illustrating a configuration in which a digital map database, a camera, and a system for detecting changes in road information are communicatively connected to each other in order to provide a service for detecting changes in road information according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of elements are omitted, it is not intended that such elements are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms.

Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to execute at least one processor. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

In the present disclosure, "road information" may include various information necessary for a vehicle to travel on a road. For example, the road information may include road lanes including a white dotted line, a while solid line, a yellow line, a blue line, a stop line, and the like, arrow markers including a straight line, a left turn, a right turn, a U-turn, and a prohibition, texts including a no waiting zone, a crosswalk, a speed bump, a speed limit, a yield, and the like, and/or information on various structures including image information, guardrails, overpasses, buildings, and the like arranged on or around the road.

In the present disclosure, a "domain" may refer to target data to be trained by a machine learning model such as an artificial neural network, or a distribution or range of such data. For example, when the artificial neural network is trained to detect changes in the road information based on image or image information, an image of a road or its surroundings captured by a camera may form a domain having a unique characteristic or distribution. In addition, when the artificial neural network is trained to detect changes in the road information based on road object information expressed in form of vector data, a high-precision map or road-layout map expressed in the form of vector data, or a two-dimensional or three-dimensional image generated based on the map may form another domain.

In the present disclosure, "domain adaptation" may refer to a technique of transferring from a domain of data that the machine learning model such as the artificial neural network is trained to classify or recognize to another domain or adapting to another domain. For example, when the machine learning model is trained to recognize, or detect the change of, the road information based on the domain of the road image captured by the camera, the domain adaptation or transfer learning may be performed to perform the same or similar inference function for the road-layout map expressed in the form of vector data or the domain of an image generated based on the map.

FIG. 1 is a schematic diagram illustrating a configuration 100 in which a digital map database 120, a camera 140, and a system 180 for detecting changes in road information are communicatively connected to each other in order to provide a service for detecting changes in road information according to an embodiment.

As illustrated in FIG. 1, the system 180 for detecting changes in road information may be connected to the digital map database (DB) 120 and the camera 140 through a network 160. The system 180 for detecting changes in road information may process a road-layout map received from a digital map DB 120 and a captured road image received from the camera 140 to sense or extract changes in road information on the road-layout map. According to an embodiment, the system 180 for detecting changes in road information may receive a road-layout map corresponding to a corresponding location from the digital map DB 120 based on location information of a road image captured by the camera 140. In addition, the system 180 for detecting changes in road information may project a road-layout map into an image using a location and camera parameters provided by the camera 140. The system 180 for detecting changes in road information may detect changes in road information on the road-layout map based on the captured road image received from the camera 140 and the projected road-layout map. The system 180 for detecting changes in road information may output a value representing changes in the road information on the road-layout map, or may output data or an image representing a corresponding region of changes in the road information.

The system 180 for detecting changes in road information may include one or more computing devices and/or databases capable of storing, providing, and executing computer executable programs (e.g., a downloadable application) and data for providing a road information change detection function or one or more distributed computing devices and/or distributed databases based on cloud computing services.

The network 160 may be configured to enable communication between the system 180 for detecting changes in road information and the digital map DB 120 and the camera 140. The network 160 may be configured as a wired network 160 such as Ethernet, a wired home network (Power Line Communication), a telephone line communication device and RS-serial communication, a wireless network 160 such as a mobile communication network, a wireless LAN (WLAN), controller area network (CAN), Wi-Fi, Bluetooth, and ZigBee, or a combination thereof, depending on the installation environment. The communication method is not limited, and may include not only a communication method using a communication network (e.g., mobile communication network, wired Internet, wireless Internet, broadcasting network, satellite network, and the like) that may be included in the network 160, but also short-range wireless communication between the camera and an external device (e.g., a position sensor associated with a camera, a memory or a car with a camera, and the like) associated with the camera. For example, the network 160 may include any one or more of networks including a personal area network (PAN), a local area network (LAN), a campus area network (CAN), a metropolitan area network (MAN), a wide area network (WAN), a broadband network (BBN), the Internet, and the like. In addition, the network 160 may include any one or more of network topologies including a bus network, a star network, a ring network, a mesh network, a star-bus network, a tree or hierarchical network, and the like, but not limited thereto.

The digital map DB 120 may store high-definition map data including information necessary for a vehicle to travel, such as road lanes, road markers, and the like. For example, the digital map DB 120 may be stored in the form of vector data including location information generated based on high-definition aerial photographs, spatial coordinates of road lanes, road markers, and the like, and geometric information (connection information such as point, line, plane, polygon, and the like) of the components. In the digital map DB 120, each of road lanes, road markers, and the like may be stored as one object, and each of the objects may be classified by a class or an identifier.

Map data stored in the digital map DB 120 in the form of vectors may be expressed in the form of a road-layout map in two-dimensional or three-dimensional representation. In the present embodiment, a "road-layout map" may refer to at least a part of a digital map or a high-definition map including map information stored in the form of vector. More specifically, the road-layout map may refer to a map in which information about each lane unit such as a road center line and a road boundary line, and the like, and information about crosswalks, signs, curbs, road markers, various structures, and the like, are stored in the form of vector. For example, the road-layout map may include spatial coordinates (x, y, z), type, and connectivity information for road lanes and road markers. In the road-layout map, each of the interconnected road lanes and road markers can be expressed as a single object, and for example, the road marker may be represented by a closed polygon, and the road lane may be represented by a straight line crossing the center. The digital map DB 120 may transmit the road-layout map corresponding to the location information of the captured road image 144 to the system 180 for detecting changes in road information.

In FIG. 1, the digital map DB 120 is located outside the system 180 for detecting changes in road information and communicates with the system 180 for detecting changes in road information through the network 160, but is not limited thereto. For example, the digital map DB 120 may be included in the system 180 for detecting changes in road information.

The camera 140 for capturing the road image 144 may include a sensor or device capable of capturing an image of, or an image that can identify the road information such as road lanes, road markers, and the like, such as a digital camera, a vehicle black box camera, a closed circuit television (CCTV), and the like. The location information of the captured road image 144 may be acquired through an image-based positioning algorithm, a location sensor, or the like. To this end, the camera 140 may include a sensor such as a GPS receiver which is capable of recognizing the location information of the captured road image 144. Alternatively, the camera 140 may be associated with a sensor that is present outside the camera 140 and capable of recognizing the location information of the captured road image 144. For example, a sensor that is present outside of the camera 140 and capable of recognizing the location information of the captured road image 144 may be included in a mobile device to which the camera 140 is attached. In this example, the location information may include a location coordinate (x, y, z) from which an image is acquired and a rotation angle (θ) of the camera in the x-y plane. In addition, the camera 140 may provide the unique camera parameters which were applied when generating the captured road image. The camera parameters may include an eigenvalue (K), a rotation matrix (R), a transition matrix (T), and the like.

The system 180 for detecting changes in road information may receive, from the camera, 140 the captured road image 144, the location information of the captured road image 144, and/or the captured road image information including the camera parameters. For example, the system 180 for detecting changes in road information may be directly connected to the camera 140 or connected via a network 160 to receive the captured road image information. In another example, the captured road image information provided by the camera 140 may be stored in an external memory connected to the camera 140, and the system 180 for detecting changes in road information may receive the captured road image information from the external memory.

As illustrated in FIG. 1, the camera 140 for capturing a road image may be attached to a vehicle 142 or the like and carried around, but is not limited thereto, and may include one or more cameras fixed at a predetermined position. Further, in FIG. 1, the system 180 for detecting changes in road information is illustrated to be connected to one camera 140, but is not limited thereto, and the system 180 for detecting changes in road information may be connected to a plurality of cameras 140.

Figure 2:
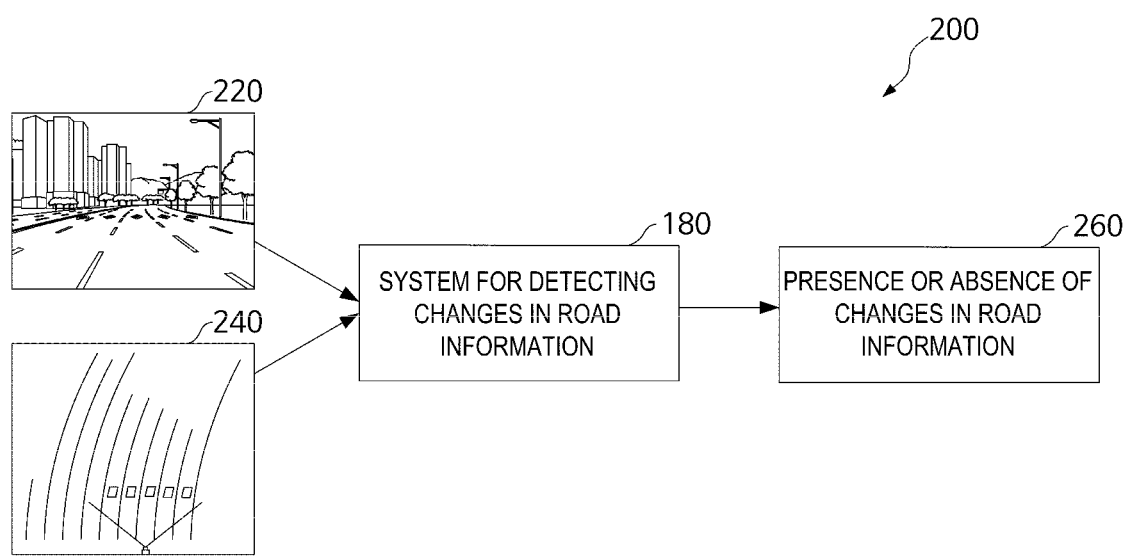
FIG. 2 is an exemplary diagram illustrating an operation indicating an input of a system for detecting changes in road information and a resultant output according to an embodiment.

FIG. 2 is an exemplary diagram illustrating an operation 200 indicating an input of the system 180 for detecting changes in road information and a resultant output according to an embodiment.

According to the operation 200 illustrated in FIG. 2, when a captured road image 220 received from the camera 140 and a road-layout map 240 received from the digital map DB 120 are input to the system 180 for detecting changes in road information, the presence or absence 260 of changes in the road information may be determined by identifying a similarity or difference between the captured road image 220 and the road-layout map 240 and may be output. Here, the road-layout map 240 may be extracted from the digital map DB 120 based on the location information of the captured road image 220. For example, the system 180 for detecting changes in road information may receive the road-layout map 240 corresponding to the region within k meters around the location (where k is any preset number) from the digital map DB 120 by using the location information of the captured road image 220 provided by the camera 140.

The system 180 for detecting changes in road information may determine the presence or absence 260 of changes in the current road information of a corresponding location in the map data (e.g., road lanes, road markers, and the like as the road information) previously stored in the digital map DB 120 by comparing the captured road image 220 and the road-layout map 240. For example, the system 180 for detecting changes in road information may determine what changes (e.g., addition, deletion, change of an object, and the like) occur in the current road information of the corresponding location in the map data previously stored in the digital map DB 120. As another example, the system 180 for detecting changes in road information may determine a region where the road information change occurs on the road-layout map (e.g., a location, a size of the region, and the like at which the road information change occurs).

Figure 3:
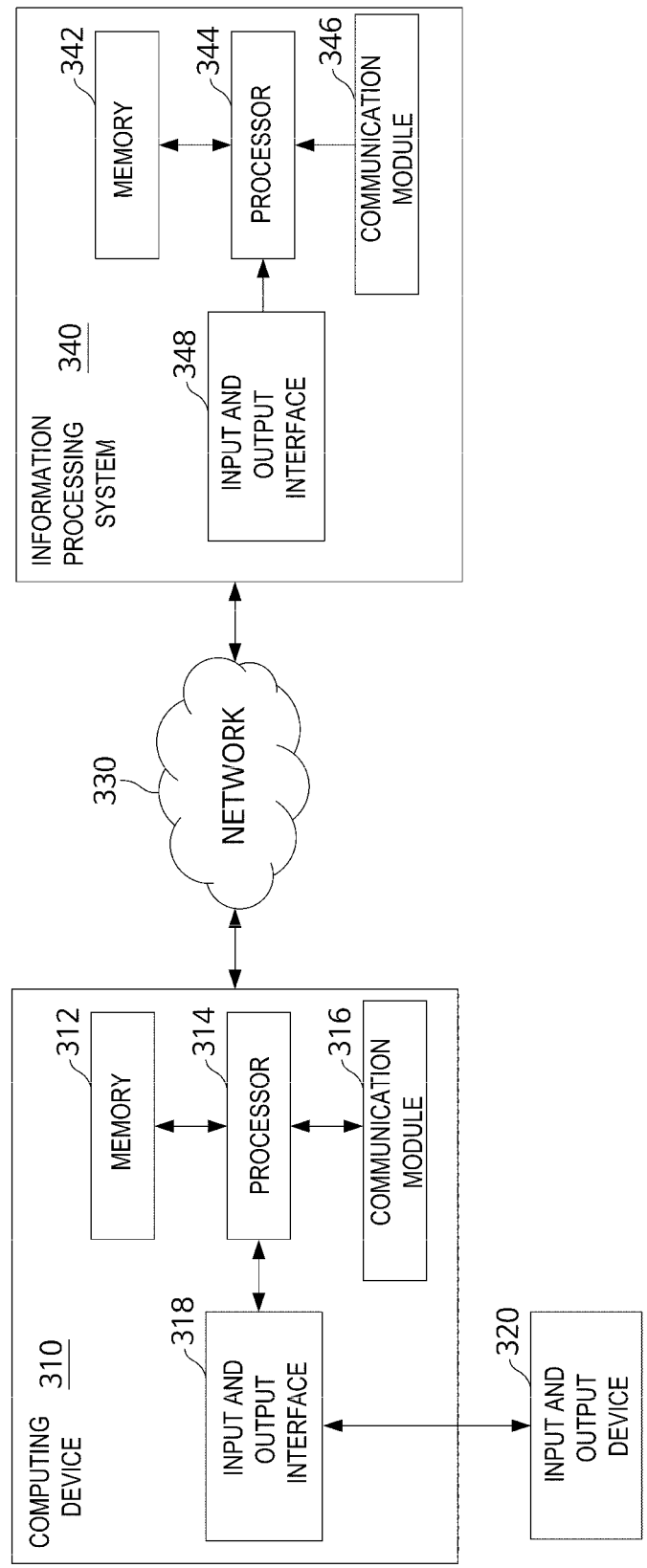
FIG. 3 is a block diagram illustrating an internal configuration of a computing device and an information processing system according to an embodiment.

FIG. 3 is a block diagram illustrating an internal configuration of a computing device 310 and an information processing system 340 according to an embodiment. The computing device 310 may refer to any device capable of capturing and/or processing an image of a road or its surroundings and capable of wired/wireless communication, and may include the camera 140, the vehicle 142, and the like of FIG. 1, for example. As illustrated, the computing device 310 may include a memory 312, a processor 314, a communication module 316, and an input and output interface 318. Likewise, the information processing system 340 (e.g., the system 180 for detecting changes in road information) may include a memory 342, a processor 344, a communication module 346, and an input and output interface 348. As shown in FIG. 3, the computing device 310 and the information processing system 340 may be configured to communicate information and/or data through the network 330 using the respective communication modules 316 and 346. In addition, the input and output device 320 may be configured to input information and/or data to the computing device 310 or to output information and/or data generated from the computing device 310 through the input and output interface 318.

The memories 312 and 342 may include any non-transitory computer-readable recording medium. According to an embodiment, the memories 312 and 342 may include a permanent mass storage device such as random access memory (RAM), read only memory (ROM), disk drive, solid state drive (SSD), flash memory, and the like. As another example, a non-destructive mass storage device such as ROM, SSD, flash memory, disk drive, and the like may be included in the computing device 310 or the information processing system 340 as a separate permanent storage device that is separate from the memory. In addition, an operating system and at least one program code may be stored in the memories 312 and 342.

These software components may be loaded from a computer-readable recording medium separate from the memories 312 and 342. Such a separate computer-readable recording medium may include a recording medium directly connectable to the computing device 310 and the information processing system 340, and may include a computer-readable recording medium such as a floppy drive, a disk, a tape, a DVD/CD-ROM drive, a memory card, and the like, for example. As another example, the software components may be loaded into the memories 312 and 342 through the communication modules 316 and 346 rather than the computer-readable recording medium. For example, at least one program may be loaded into the memories 312 and 342 based on a computer program installed by files provided by developers or a file distribution system that distributes an installation file of an application through the network 330.

The processors 314 and 344 may be configured to process instructions of the computer program by performing basic arithmetic, logic, and input and output operations. The instructions may be provided to the processors 314 and 344 from the memories 312 and 342 or the communication modules 316 and 346. For example, the processors 314 and 344 may be configured to execute the received instructions according to program code stored in a recording device such as the memories 312 and 342.

The communication modules 316 and 346 may provide a configuration or function for the computing device 310 and the information processing system 340 to communicate with each other through the network 330, and may provide a configuration or function for the computing device 310 and/or the information processing system 340 to communicate with another computing device 310 or another system (e.g., a separate cloud system or the like). For example, the requests or data generated by the processor 314 of the computing device 310 according to the program code stored in the recording device such as the memory 312 or the like may be transmitted to the information processing system 340 through the network 330 under the control of the communication module 316. Conversely, a control signal or instructions provided under the control of the processor 344 of the information processing system 340 may be received by the computing device 310 through the communication module 316 of the computing device 310 via the communication module 346 and the network 330.

The input and output interface 318 may be a means for interfacing with the input and output device 320. As an example, the input device of the input and output device 320 may include a device such as a camera, a keyboard, a microphone, and a mouse, which includes an image sensor and/or an audio sensor, and the output device of the input and output device 320 may include a device such as a display, a speaker, a haptic feedback device, and the like. As another example, the input and output interface 318 may be a means for interfacing with a device such as a touch screen or the like that integrates a configuration or function for performing inputting and outputting. For example, when the processor 314 of the computing device 310 processes the instructions of the computer program loaded in the memory 312, a service screen or the like, which is configured with the information and/or data provided by the information processing system 340 or other computing devices may be displayed on the display through the input and output interface 318. While FIG. 3 illustrates that the input and output device 320 is not included in the computing device 310, embodiment is not limited thereto, and it may be configured as one device with the computing device 310. In addition, the input and output interface 348 of the information processing system 340 may be a means for interfacing with a device (not illustrated) for inputting or outputting, which may be connected to the information processing system 340 or included in the information processing system 340. In FIG. 3, the input and output interfaces 318 and 348 are illustrated as the components configured separately from the processors 314 and 344, but are not limited thereto, and the input and output interfaces 318 and 348 may be configured to be included in the processors 314 and 344, respectively.

The computing device 310 and the information processing system 340 may include more components than the components illustrated in FIG. 3. However, it would be unnecessary to exactly illustrate all of the related components. According to an embodiment, the computing device 310 may be implemented to include at least some of the input and output devices 320 described above. In addition, the computing device 310 may further include other components such as a global positioning system (GPS) module, a Lidar, a wheel encoder, an inertial measurement unit (IMU), a transceiver, various sensors, a database, and the like.

According to an embodiment, the processor 314 of the computing device 310 may be configured to extract image data or features of an image. In this case, an associated program code may be loaded into the memory 312 of the computing device 310. While the program code is running, the processor 314 of the computing device 310 may receive information and/or data provided from the input and output device 320 through the input and output interface 318 or receive information and/or data from the information processing system 340 through the communication module 316, and may process the received information and/or data and store it in the memory 312. In addition, such information and/or data may be provided to the information processing system 340 through the communication module 316.

The processor 314 may receive images or selected text, and the like through input devices such as an image sensor, a GPS module, a touch screen, a keyboard, an audio sensor, and the like connected to the input/output interface 318, and may store the received images, location information, camera parameters, text, and the like in the memory 312 or provide them to the information processing system 340 through the communication module 316 and the network 330. In an embodiment, the processor 314 may provide the captured image, the location information, and the camera parameters received through the input device to the information processing system 340 through the network 330 and the communication module 316. Alternatively, the processor 314 may extract the features of the captured image and provide the same to the information processing system 340 together with the location information and the camera parameters.

The processor 344 of the information processing system 340 may be configured to manage, process, and/or store the information and/or the data received from a plurality of computing devices and/or a plurality of external systems. According to an embodiment, the processor 344 may generate a projected road-layout map and/or information or a map indicating the presence or absence of changes in the road information or a region of such changes based on the data received from the computing device 310. Additionally, or alternatively, the processor 344 may transmit a projected road-layout map and/or information or a map indicating the presence or absence of changes in road information or a region of such changes, and the like to the computing device 310.

Figure 4:
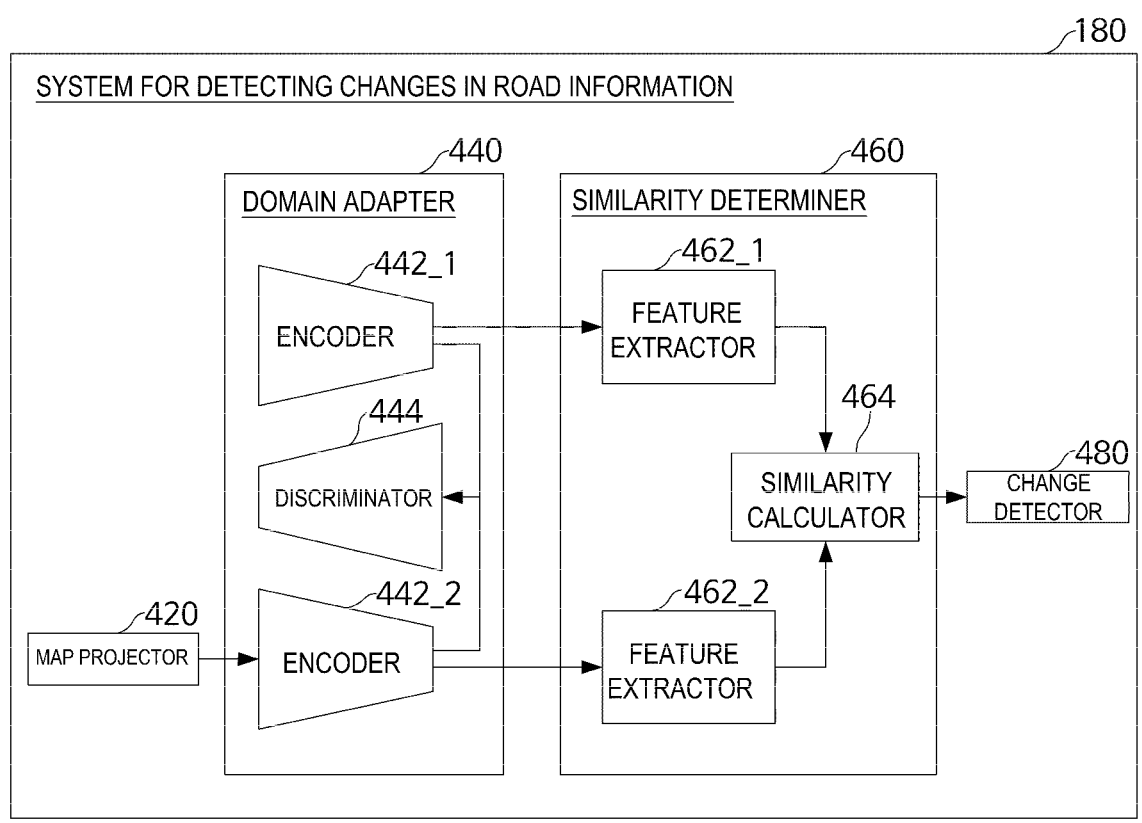
FIG. 4 is a block diagram illustrating an internal configuration of a system for detecting changes in road information according to an embodiment.

FIG. 4 is a block diagram illustrating an internal configuration of the system 180 for detecting changes in road information according to an embodiment. As illustrated, the system 180 for detecting changes in road information may include a map projector 420, a domain adapter 440, a similarity determiner 460, and a change detector 480. In addition, the domain adapter 440 may include two encoders 442_1 and 442_2 and a discriminator 444, and the similarity determiner 460 may include two feature extractors 462_1 and 462_2 and a similarity calculator 464.

The map projector 420 may receive the location information and the camera parameters of the captured road image from the camera 140, and may receive the road-layout map from the digital map DB 120. The map projector 420 may project the road-layout map using the location information and the camera parameters of the captured road image. The map projector 420 may use a known algorithm for projecting three-dimensional world coordinates onto a two-dimensional image plane in projecting the road-layout map. Specifically, the map projector 420 may extract all road-layout objects within k meters around the location by using the location information (e.g., x, y, z coordinates) of the captured road image. For example, in order to solve the problem of difficulty of projection into image because the road lane object is represented by lines among the road-layout objects, the map projector 420 may perform a dilation operation on the road lane object and convert it into polygon data having a predetermined width. In addition, in order to prevent errors that may occur during the projection of the road-layout map, the map projector 420 may remove objects within a predetermined distance in front of the camera 140 in the road-layout map by using the rotation angle of the camera. The map projector 420 may be configured to input the projected road-layout map to the second encoder 442_2, which is one of the two encoders 442_1 and 442_2 included in the domain adapter 440.

The domain adapter 440 may be configured to convert the captured road image and the projected road-layout map into first intermediate data and second intermediate data of the same feature space, respectively. That is, the domain adapter 440 may be configured to perform the domain adaptation between the captured road image or the projected road-layout map. According to an embodiment, the first encoder 442_1 included in the domain adapter 440 may convert the captured road image into the first intermediate data, and the second encoder 442_2 included therein may convert the projected road-layout map into the second intermediate data. For example, the first intermediate data and the second intermediate data may correspond to data of the same feature space in the form of four-dimensional tensor.

The discriminator 444 included in the domain adapter 440 may be configured to receive the first intermediate data and the second intermediate data from each of the encoders 442_1 and 442_2, and calculate a domain difference between the first intermediate data and the second intermediate data. According to an embodiment, a difference between an expected value of an output value of the discriminator for first intermediate data and an expected value of an output value of the discriminator for second intermediate data may be calculated as the domain difference. When the first encoder 442_1 and the second encoder 442_2 of the domain adapter 440 are implemented as an artificial neural network-based machine learning model which will be described below, the first encoder 442_1 and the second encoder 442_2 may be trained to minimize a difference between the domain of the first intermediate data and the domain of the second intermediate data calculated by the discriminator 444.

The similarity determiner 460 may include the feature extractors 462_1 and 462_2 configured to extract the features of each of the captured road image and the projected road-layout map, and the similarity calculator 464 that calculates similarity based on the extracted feature values. The feature extractors 462_1 and 462_2 may receive the first intermediate data and the second intermediate data from the encoders 442_1 and 442_2 of the domain adapter 440, respectively. The feature extractors 462_1 and 462_2 may extract the features of each of the captured road image and the road-layout map based on the received first intermediate data and the second intermediate data. For example, the first intermediate data and the second intermediate data received from the encoders 442_1 and 442_2 of the domain adapter 440 may correspond to data in the form of four-dimensional tensor, and the features extracted from the feature extractors 462_1 and 462_2 may correspond to data in the form of one-dimensional feature vector.

The similarity calculator 464 of the similarity determiner 460 may calculate the similarity by using the feature value of the captured road image extracted through the feature extractors 462_1 and 462_2 and the feature value of the projected road-layout map. For example, the similarity calculator 464 may calculate the similarity through the dot product of the feature values in the form of one-dimensional feature vector received from the feature extractors 462_1 and 462_2. As another example, the similarity calculator 464 may calculate the similarity through correlation between the feature values in the form of one-dimensional feature vector received from the feature extractors 462_1 and 462_2.

The similarity determiner 460 may include a metric learning artificial neural network configured to calculate a distance between the features extracted from the captured road image and the road-layout map as a similarity. To this end, a metric learning artificial neural network may be configured to calculate a similarity between the captured road image and the projected road-layout map using a triplet loss function that enforces a similarity between the captured road image and a positive image which is the projected road-layout map corresponding to the captured road image to be larger by a margin than a similarity between the captured road image and a negative image which is the projected road-layout map not corresponding to the captured road image. Meanwhile, the margin adapted for the triplet loss function of the metric learning artificial neural network may be adjusted according to the domain difference between the first intermediate data and the second intermediate data calculated by the domain adapter 440. For example, in the initial stage of learning where the domain difference between the two input data of the metric learning artificial neural network, the captured road image and the projected road-layout map, is large, the margin is decreased, so that learning is still performed with little loss. On the other hand, in the training phase in which the domain difference between the captured road image and the projected road-layout map is decreased, the margin is increased and the training is performed so that it converges to the margin designed for the metric learning artificial neural network. As described above, by adjusting the margin of the triplet loss function according to the domain difference between the two data inputs to the metric learning artificial neural network or the degree of domain adaptation, the metric learning artificial neural network can be trained to identify or detect the difference with high accuracy even for the input data having different domains.

In training a metric learning artificial neural network, when a specific object-displaying region in either the positive image or the negative image is occluded by another moving object (e.g., a moving vehicle or a pedestrian) in the captured road image, the image and the captured road image may not be used for training. That is, an image in which a region where a specific object is displayed among the positive image or the negative image is occluded by another dynamic object in the captured road image may not be used as training data of the metric learning artificial neural network. Through this training method, when the system 180 for detecting changes in road information detects changes in the road information, an error due to a dynamic object may be reduced.

The change detector 480 may be configured to detect the presence or absence of changes in the road information on the projected road-layout map based on the similarity calculated by the similarity calculator 464 of the similarity determiner 460. The change detector 480 may calculate a degree of change of the road information on the projected road-layout map through the similarity value calculated by the similarity calculator 464. For example, when the similarity calculator 464 calculates the similarity by dot product $(x_i^T \cdot x_M)$ of the feature values in the form of a one-dimensional feature vector, a value $(1-x_i^T \cdot x_M)$ obtained by subtracting the similarity from 1 may be defined as the degree of change.

When the similarity value calculated by the similarity calculator 464 is equal to or greater than a preset threshold value, the change detector 480 may determine that there is no change in the current road information as compared with the projected road-layout map. On the other hand, when the calculated similarity value is equal to or less than a preset threshold value, the change detector 480 may determine that the change has occurred in the current road information as compared with the projected road-layout map.

In FIG. 4, although the system 180 for detecting changes in road information is illustrated as including the map projector 420, the domain adapter 440, the similarity determiner 460, and the change detector 480, it is not limited thereto, and may include more components than the components of FIG. 4. In addition, although it is illustrated that the similarity determiner 460 and the change detector 480 are separate from each other, the present disclosure is not limited thereto, and the change detector 480 may be included in the similarity determiner 460.

Figure 5:
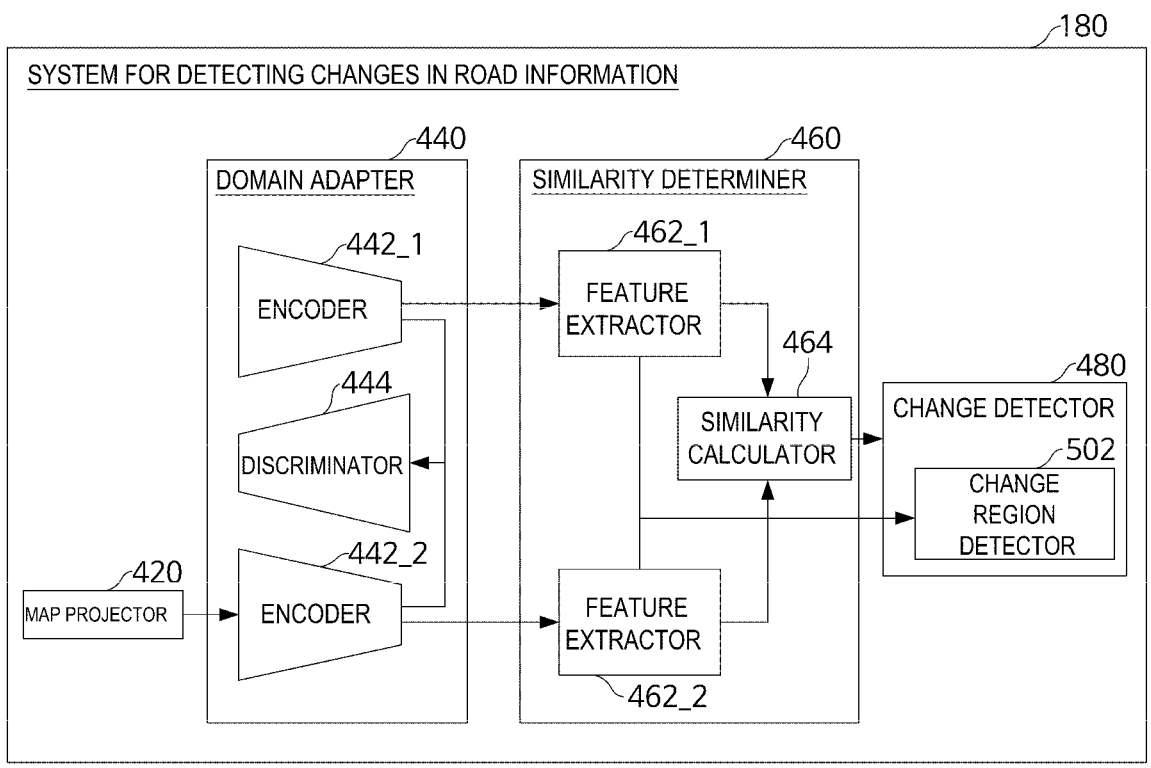
FIG. 5 is a block diagram illustrating an internal configuration of a system for detecting changes in road information according to another embodiment.

FIG. 5 is a block diagram illustrating an internal configuration of the system 180 for detecting changes in road information according to another embodiment.

The system 180 for detecting changes in road information may include the map projector 420, the domain adapter 440, the similarity determiner 460, and the change detector 480. Since the map projector 420, the domain adapter 440, and the similarity determiner 460 have been described in detail with reference to FIG. 4, redundant descriptions thereof will be omitted below. The change detector 480 may include a change region detector 502.

During the process of extracting the features of the captured road image and the projected road-layout map by the feature extractors 462_1 and 462_2 of the similarity determiner 460, third intermediate data and fourth intermediate data may be generated, respectively. The third intermediate data and the fourth intermediate data thus generated may be transmitted to the change region detector 502 of the change detector 480.

The change region detector 502 of the change detector 480 may receive the third intermediate data and the fourth intermediate data from the feature extractors 462_1 and 42_2 of the similarity determiner 460, respectively. The third intermediate data and the fourth intermediate data received by the change region detector 502 may correspond to data of a different form from the feature values received from the feature extractors 462_1 and 462_1 in order for the similarity calculator 464 to calculate the similarity between the captured road image and the projected road-layout map, as described with reference to FIG. 4. For example, the third intermediate data and the fourth intermediate data may be at least some of intermediate data used by the feature extractors 462_1 and 462_1 to output a final feature value.

The change region detector 502 may generate a change value map based on the received third intermediate data and the fourth intermediate data. Here, the generated change value map may refer to a map displaying a region of change on the projected road-layout map compared with the captured road image. In addition, the change value map may refer to an image displaying a region of change projected on the same space as the projected road-layout map or the captured road image. For example, when an object displayed on the projected road-layout map is not in a corresponding region in the captured road image, or when an object not displayed on the projected road-layout map is present in the captured road image, or when an object other than the object displayed on the projected road-layout map is present in a corresponding region in the captured road image, the corresponding regions may be displayed on the change value map. In addition, the region displayed on the change value map may be displayed in different colors according to the type of change (e.g., deletion, change, addition of object).

In FIG. 5, although the system 180 for detecting changes in road information is illustrated as including the map projector 420, the domain adapter 440, the similarity determiner 460, and the change detector 480, it is not limited thereto, and may include more components than the components of FIG. 5.

Figure 6:
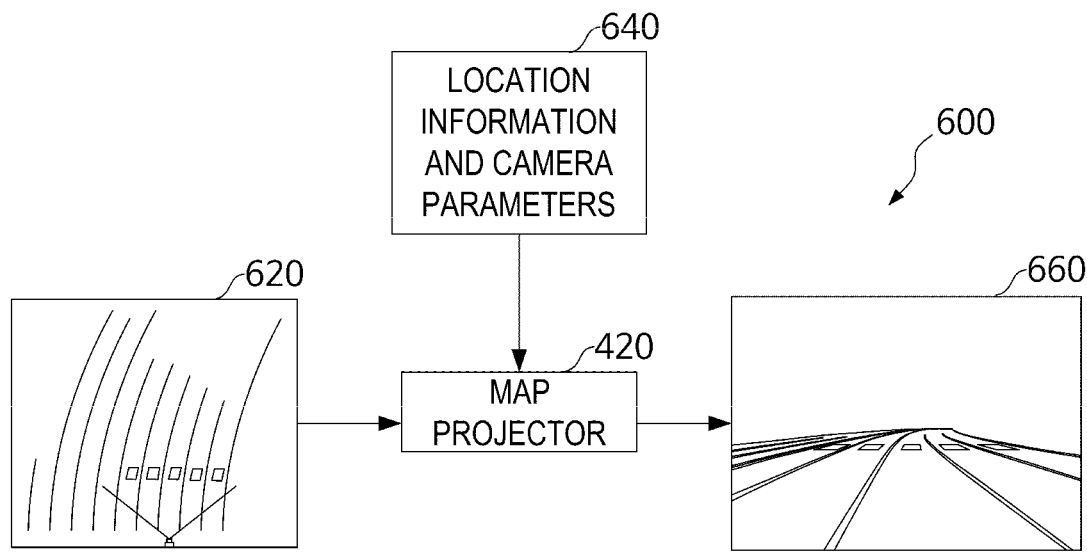
FIG. 6 is an exemplary diagram illustrating an input of a map projector of a system for detecting changes in road information and a resultant output according to an embodiment.

FIG. 6 is an exemplary diagram illustrating an input of the map projector 420 of the system 180 for detecting changes in road information and a resultant output according to an embodiment.

As described above, the system 180 for detecting changes in road information may include the map projector 420. The map projector 420 may receive the road-layout map extracted from the digital map DB 120 according to the location coordinates (x, y, z) of the captured road image received by the system 180 for detecting changes in road information. For example, the map projector 420 may extract and receive a road-layout map 620 corresponding to a range of surrounding k meters from a corresponding location in the road-layout map extracted from the digital map DB 120. In addition, the map projector 420 may extract a road-layout object included in the surrounding k meters from the corresponding location from the digital map DB 120 according to the location coordinates (x, y, z) of the captured road image received by the system 180 for detecting changes in road information. Here, the received road-layout map 620 may include coordinates, type, connectivity information, and the like for the location of a road lane, or a road marker, and each of the connected lanes, road marker, and the like may correspond to one object. In the road-layout map 620, the road markers may be represented by closed polygons, and the road lane may be represented by the straight line crossing the center.

The map projector 420 may cut out the objects corresponding to any distance in front of the camera by using the camera rotation angle to prevent errors that may occur when projecting the road-layout map 620. Further, in consideration of the fact that the width of the actual lane is 20 cm, the lane object represented as a straight line in the road-layout map 620 may be converted into polygon data having a width of 20 cm through an expansion operation.

The map projector 420 may project the road-layout objects into the image space using the received location information and the camera parameter 640. That is, as in the illustrated operation 600, the map projector 420 may project the three-dimensional road-layout map 620 into a two-dimensional image space that is same as that of the captured road image, to generate the projected road-layout map 660.

As illustrated in FIGS. 4 and 5, the map projector 420 may be included in the system 180 for detecting changes in road information, but is not limited thereto, and the map projector 420 may be present outside the system 180 for detecting changes in road information and connected to the system for detecting changes in road information. For example, the map projector 420 may receive the road-layout map 620 from the digital map DB 120 outside of the system 180 for detecting changes in road information and transmit the projected road-layout map 660 to the system 180 for detecting changes in road information.

Figure 7:
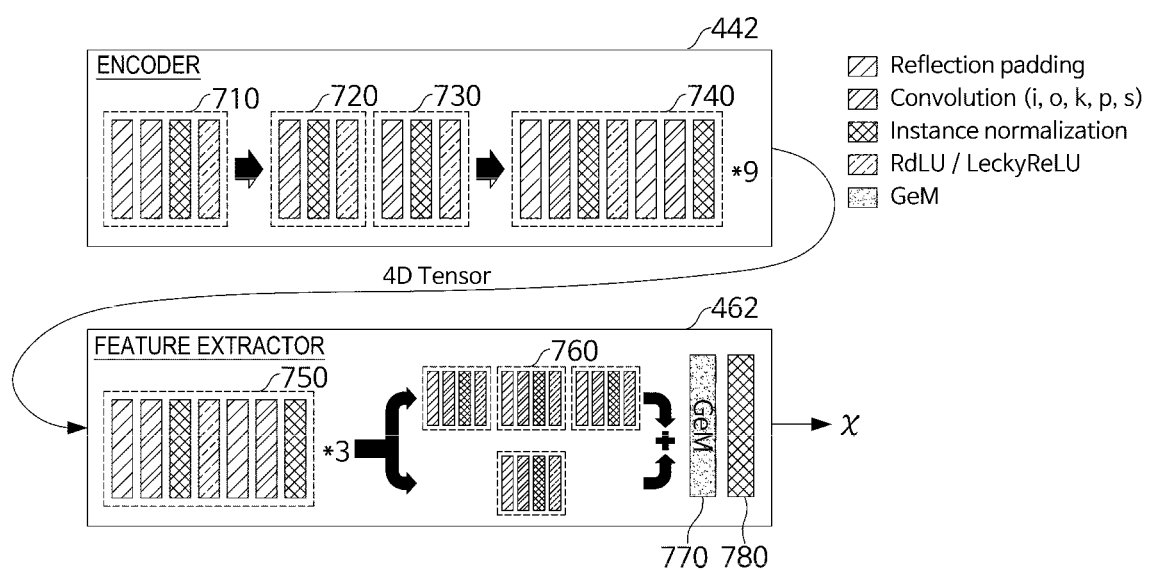
FIG. 7 is a block diagram illustrating an internal configuration of an encoder and a feature extractor according to an embodiment.

FIG. 7 is a block diagram illustrating an internal configuration of the encoder 442 and the feature extractor 462 according to an embodiment.

The system 180 for detecting changes in road information may include a metric learning artificial neural network configured to measure a similarity between a captured road image and a projected road-layout map. Here, the system 180 for detecting changes in road information may use the artificial neural network model illustrated in FIG. 7 to extract the feature values of each of the captured road image and the projected road-layout map in order to measure the similarity between the captured road image and the projected road-layout map. FIG. 7 illustrates only the configuration of the artificial neural network model corresponding to one encoder 442 and one feature extractor 462 for convenience of explanation, but this may include two encoders including the configuration of the same or similar artificial neural network models that receive the captured road image and the projected road-layout map respectively, and two feature extractors corresponding thereto.

According to the artificial neural network model structure illustrated in FIG. 7, the encoder 442 is an encoder of a recursively generative adversarial neural network (Cycle-GAN), which may include a first structure 710 including a reflection padding layer, a convolution layer, an instance normalization layer, and a rectified linear unit/leaked rectified linear unit (ReLU/LeakyReLU) layer in order, a second structure 720 including a convolution layer, an instance normalization layer, and a rectified linear unit/leaked rectified linear unit layer in order, a third structure 730 including the same layers as the second structure, and a fourth structure 740 including a reflection padding layer, a convolution layer, an instance normalization layer, a rectified linear unit/leaked rectified linear unit, a reflection padding layer, the convolution layer, and an instance normalization layer in order. The encoder 442 may be configured to pass the input captured road image or projected road-layout map through the first structure 710, the second structure 720, and the third structure 730, and repeatedly pass through the fourth structure 740 nine times. Each of the two encoders 442 may output first intermediate data and second intermediate data in the form of four-dimensional tensor.

The two feature extractors 462 may receive the first intermediate data or the second intermediate data in the form of four-dimensional tensor from the two encoders 442, respectively. The feature extractor 462 may include a first structure 750 in the same form as the fourth structure 740 of the encoder 442, a second structure 760 including a reflection padding layer, a convolution layer, an instance normalization layer, and a rectified linear unit/leaked rectified linear unit layer in order, and a generalized mean (GeM) pooling layer, and an instance normalization layer. Here, the first structure 750 may refer to a residual block. The feature extractor 462 may be configured to repeatedly pass the input first intermediate data or second intermediate data through the first structure 750 three times, add the data output from the first structure 750 to the data passed through the second structure 720 once and the data passed through the second structure 720 three times, and pass the result through the generalized mean (GeM) pooling layer 770 and the object normalization layer 780. Each of the two feature extractors 462 may output a feature value (x) in the form of one-dimensional feature vector.

Here, the convolution layers included in the configuration of the encoder 442 and the feature extractor 462 may perform convolution according to the values of different parameters (e.g., input size (i), output size (o), kernel (k), pooling size (p), stride (s)).

Figure 8:
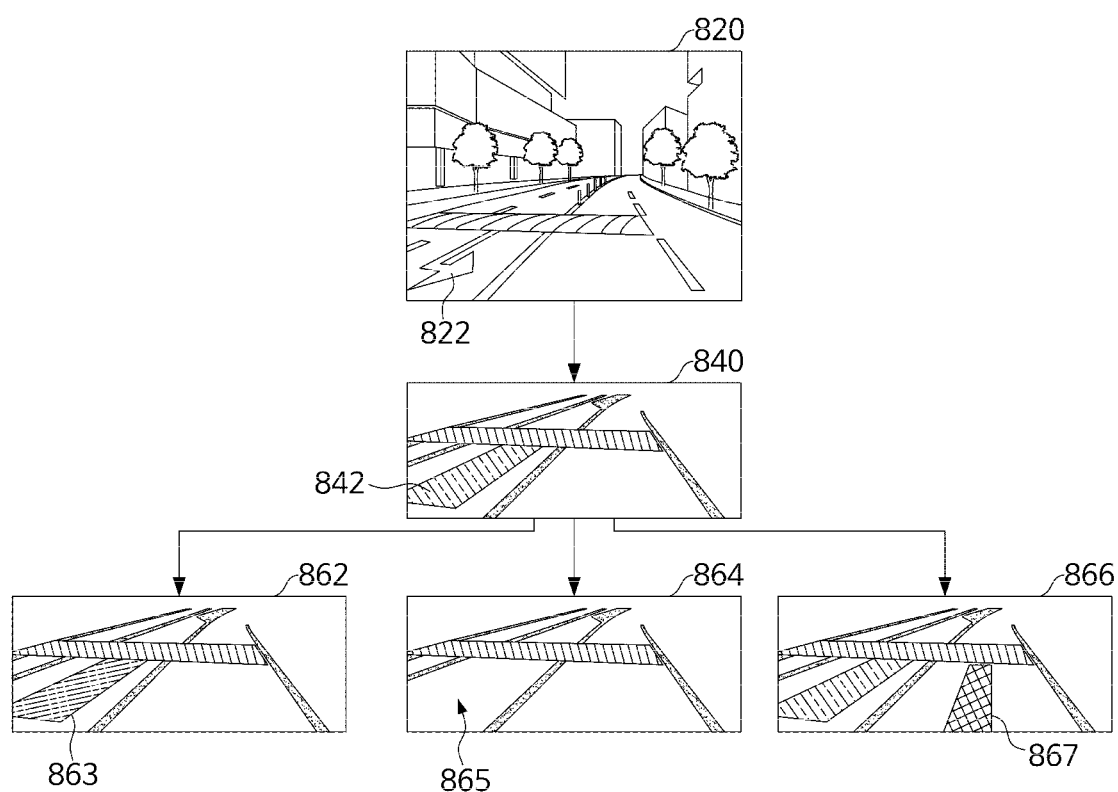
FIG. 8 is an exemplary diagram illustrating an operation of generating training data for a system for detecting changes in road information according to an embodiment.

FIG. 8 is an exemplary diagram illustrating an operation of generating training data for the system 180 for detecting changes in road information according to an embodiment.

The metric learning artificial neural network included in the similarity determiner 460 is configured to calculate a similarity between a captured road image and a projected road-layout map using the triplet loss function that enforces a similarity between the captured road image and a positive image which is the projected road-layout map corresponding to the captured road image to be greater by a margin than a similarity between the captured road image and a negative image which is the projected road-layout map not corresponding to the captured road image. For example, the loss function used for training the metric learning artificial neural network can be expressed as the following equation.

$$\text{Loss(Loss Function)}=\max(0,(d(x_r,x_p)+m-d(x_r,x_n)))$$

where $x_r$ is a feature value of the captured road image, $x_p$ is a feature value of the positive image, $x_n$ is a feature value of the negative image, and $d(x, y)$ is a distance between x and y. That is, as the distance between the images or the features of the image decreases, it may be determined that the similarity is greater, and as the distance increases, it may be determined that the similarity is smaller.

To train such a metric learning artificial neural network, a dataset may be artificially generated. Therefore, even when there is no change in the current road information compared with the road information on the road-layout map, the changed-reflected data may be artificially generated, and accordingly, the artificial neural network can be trained using the generated data. According to an embodiment, as illustrated in FIG. 8, a negative image may be generated by changing 862, removing 864 or adding 866 an object into a projected road-layout map 840 corresponding to a captured road image 820. For example, when an object 842 representing a left turn arrow 822 is present in a specific region on the projected road-layout map 840 corresponding to the captured road image, a negative image may be generated by changing the object 842 representing the left turn arrow to an object 863 representing the straight arrow or by removing the object 842 representing the left turn arrow 865. In addition, on the projected road-layout map 840 corresponding to the captured road image, an object 867 representing a speed limit road marker (speed limit) may be inserted into a specific region where no object is present, thereby generating a negative image.

According to another embodiment, a positive image used to train the metric learning artificial neural network may be generated by adding a random position error to a projected road-layout map corresponding to the captured road image. For example, a positive image may be generated, to which a random error set in the range of (−1, 1) and the range of (−5, 5) for the camera rotation angle (θ) with respect to the position coordinate (x, y) is added. As described above, by adding the random error to the projected road-layout map, the metric learning artificial neural network may be robustly trained against position errors. That is, when there is a slight difference in the location of the captured road image and the road-layout map and the camera rotation angle, the metric learning artificial neural network can be trained to ignore these errors and detect the presence or absence of actual changes in the road information.

Figure 9:
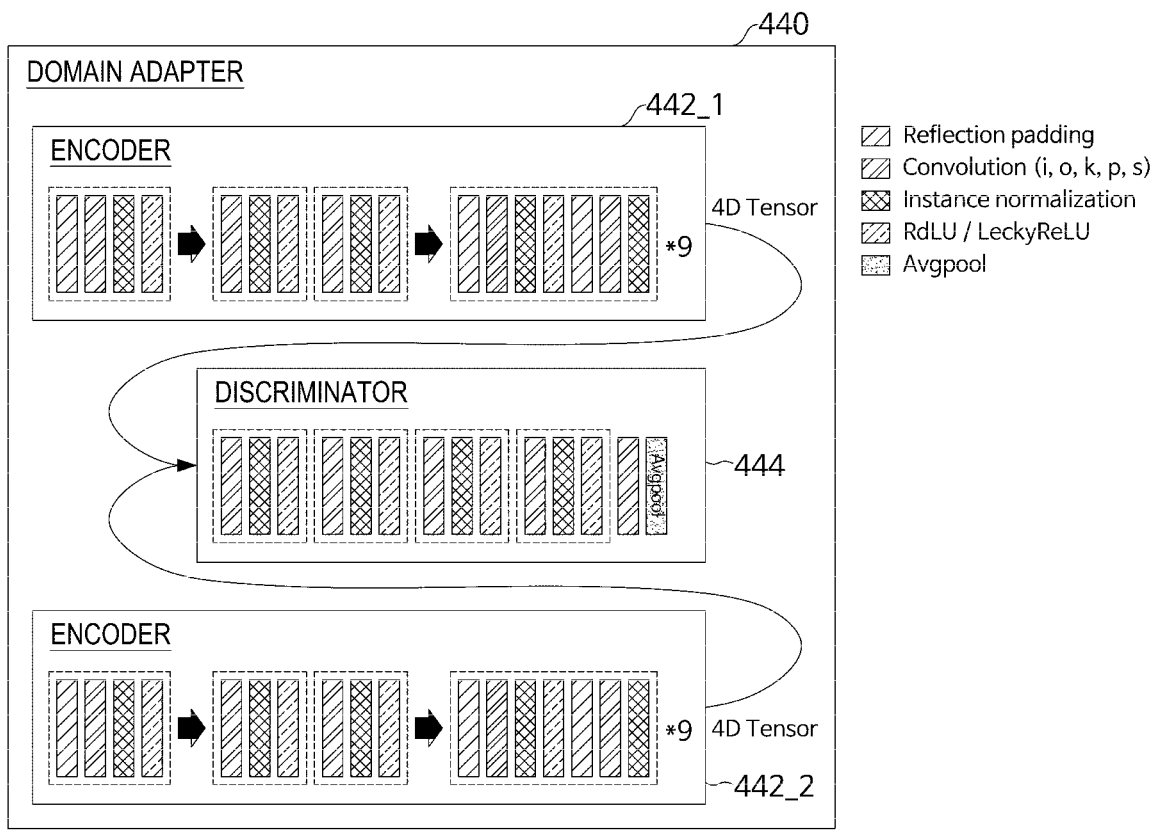
FIG. 9 is a block diagram illustrating an internal configuration of a domain adapter according to an embodiment.

FIG. 9 is a block diagram illustrating an internal configuration of the domain adapter 440 according to an embodiment.

The domain adapter 440 may be configured to perform the domain adaptation in order to perform a metric learning between a captured road image and a road-layout map of different forms of data, that is, data of different domains. In order to perform this domain adaptation, the domain adapter 440 may include two encoders 442_1 and 442_2 and one discriminator 444, as illustrated.

The domain adapter 440 may use the artificial neural network model illustrated in FIG. 9 to perform domain adaptation. Such an artificial neural network model may correspond to an adversarial learning artificial neural network. The adversarial learning artificial neural network for domain adaptation may be trained in conjunction with the metric learning artificial neural network included in the system 180 for detecting changes in road information.

Since the structure of the encoders 442_1 and 442_2 of the domain adapter 440 has been described in detail with reference to FIG. 7, redundant descriptions thereof will be omitted below. According to the artificial neural network model structure illustrated in FIG. 9, the discriminator 444 may receive the first intermediate data and the second intermediate data from respective encoders 442_1 and 442_2. In this example, the received first intermediate data and the second intermediate data may be data in the form of four-dimensional tensor.

The discriminator 444 may be configured to repeatedly perform data conversion four times by the structure including the convolution layer, the instance normalization layer, and the rectified linear unit/leaked rectified linear unit layer in order, and perform data conversion by the convolution layer and the average pooling (Avgpool) layer.

The discriminator 444 of the domain adapter 440 may be trained to return closeness of the domain of the input data to the target domain as a scalar value. According to an embodiment, the first encoder 442_1 and the second encoder 442_2 may be trained such that an output value of the discriminator for the first intermediate data is a first value, and an output value of the discriminator for the second intermediate data is a second value, while the discriminator 444 may be trained such that the output value of the discriminator for first intermediate data is the second value, and the output value of the discriminator for second intermediate data is the first value. For example, the first encoder 442_1 may be trained such that the output value of the discriminator 444 for the first intermediate data is 1, and the second encoder 442_2 may be trained such that the output value of the discriminator for the second intermediate data is 0. The discriminator 444 may also be trained such that an output value of the discriminator for the first intermediate data is 0, and an output value of the discriminator for the second intermediate data is 1.

The discriminator 444 may calculate the domain difference between the first intermediate data and the second intermediate data. According to an embodiment, the difference between the expected value of the output value of the discriminator 444 for the first intermediate data and the expected value of the output value of the discriminator 444 for the second intermediate data may be calculated as the domain difference. The adversarial learning artificial neural network included in the domain adapter 440 may be trained so that the difference between the domains calculated by the discriminator 444 is minimized.

According to the difference between the domains calculated by the discriminator 444, the margin (m) in the triplet loss of the metric learning artificial neural network included in the similarity determiner may be adjusted. The adaptive margin (m'') adjusted according to the domain difference may be expressed by the following formula.

$$m'=m\times\exp(-|\nabla\alpha|/\beta)$$

where m is the triplet loss margin, α is the domain difference, β is the attenuated level, and m' is the adaptive margin.

For example, since the adversarial learning artificial neural network included in the domain adapter 440 is trained such that the domain difference is small, when the domain difference is large at the beginning of the training process (when the change in the domain difference is large), the value of the adaptive margin (m') is set to be small, so that the metric learning artificial neural network can be trained even with a small loss. On the other hand, when the domain difference is small in the latter half of the training process (when the change in the domain difference is small), the adaptive margin (m') may converge to a margin (m) of a certain value designed for training of the metric learning artificial neural network.

Figure 10:
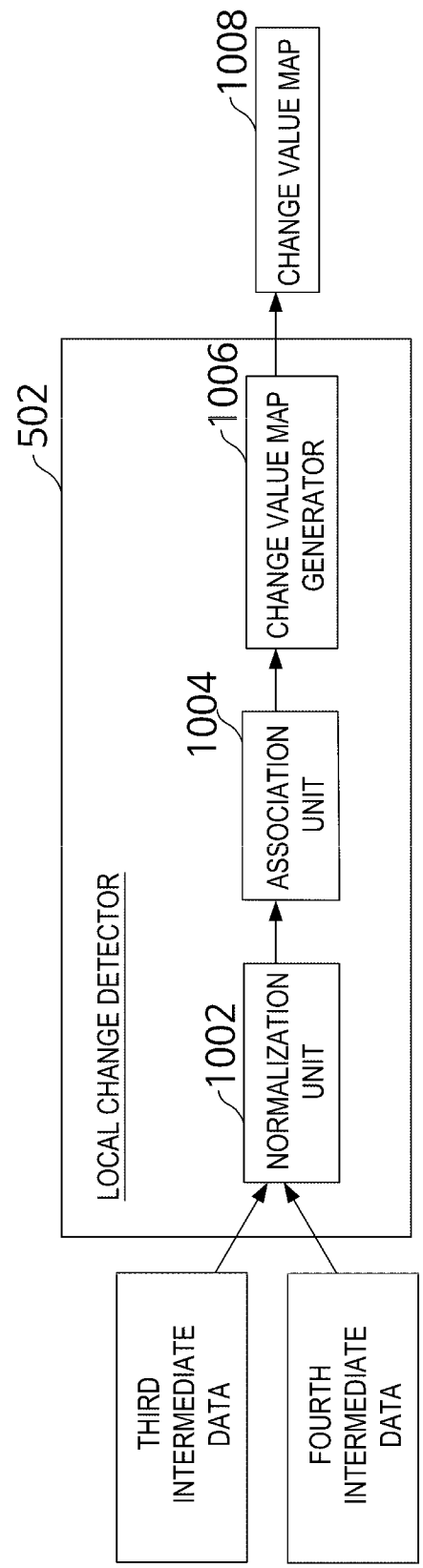
FIG. 10 is a block diagram illustrating an internal configuration of a change region detector according to an embodiment.

FIG. 10 is a block diagram illustrating an internal configuration of a change region detector 502 according to an embodiment.

The change region detector 502 may include a normalization unit 1002, an association unit 1004, and a change value map generator 1006. The change region detector 502 may generate a change value map 1008 including a mask indicating a region where a change occurs between the captured road image and the projected road-layout map, and this function may be performed through an artificial neural network. In this example, the change value map 1008 may have the same resolution as the captured road image or the projected road-layout map.

In order to train the artificial neural network for generating the change value map 1008 including the mask indicating a region where the change occurs between the captured road image and the projected road-layout map, a ground truth mask may be defined using the projected road-layout map M and the artificially changed image S. For example, the ground truth mask ($l^{gt}$) may be defined as follows.

$$l^{gt} = \Pi(M \neq S)$$

The change region detector 502 may receive third intermediate data and fourth intermediate data from the feature extractor of the similarity calculator. Here, the third intermediate data and the fourth intermediate data may correspond to the last intermediate feature tensor among the intermediate feature tensors calculated in the step prior to the global pooling step in the process of extracting the features of the captured road image and the projected road-layout map by the feature extractor.

The normalization unit 1002 may perform instance-wise normalization on the input third intermediate data and fourth intermediate data. The association unit 1004 may concatenate the third intermediate data and the fourth intermediate data and input the concatenated data to the change value map generator 1006. Here, the change value map generator 1006 may include a U-net structure that outputs a result in the same size as the input size. In one embodiment, the U-net architecture may include a contracting path and an expansive path, as is known. The contracting path may include a typical convolutional network, and specifically, may include a plurality of unpadded convolutions, a rectified linear unit (ReLU) for downsampling, and a max pooling operation. The extension path may include upsampling of the feature map, a plurality of upconvolutions, and ReLU.

Figure 11:
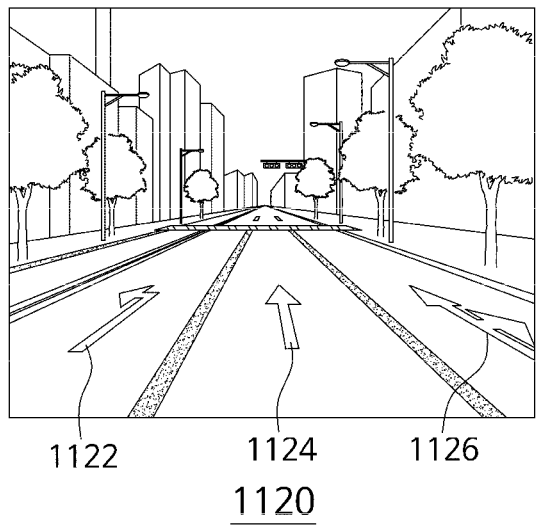
FIG. 11 is an exemplary diagram illustrating a change value map generated based on a captured road image and a projected road-layout map by a system for detecting changes in road information according to an embodiment.
Figure 11:
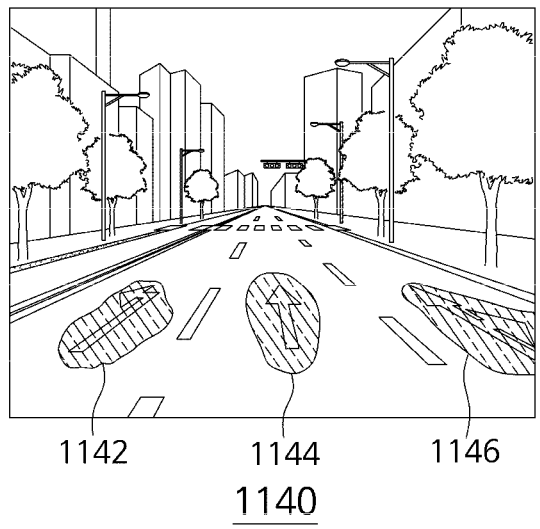

FIG. 11 is an exemplary diagram illustrating a change value map 1140 generated according to a captured road image and a projected road-layout map by the system 180 for detecting changes in road information according to an embodiment.

In order to effectively display the changes in road information in the system 180 for detecting changes in road information, the captured road image, the projected road-layout map, and/or the change value map of the road information may be superimposed and output as one image. For example, as illustrated in FIG. 11, an image 1120 may be generated, in which the projected road-layout map is superimposed on the captured road image, such that the objects included in the projected road-layout map are superimposed on the actually captured road image.

The system 180 for detecting changes in road information may generate the change value map 1140 indicating a region with changes in the road information, based on the captured road image and the road-layout map. The change value map 1140 may include a mask generated by masking (1142, 1144, 1146) the changed region of the road information. As illustrated, when the change value map 1140 is generated, the system 180 for detecting changes in road information superimposes the change value map 1140 on the captured road image and displays the result, so that the changed region of the map information may be effectively displayed on the captured road image.

For example, as illustrated, when an object corresponding to a left turn arrow 1122, a straight arrow 1124, and a straight/right turn arrow 1126 appearing in the captured road image is not displayed on the projected road-layout map, a change value map may be generated by detecting the absence of the object in the corresponding region and masking (1142, 1144, 1146) the corresponding region of change.

Figure 12:
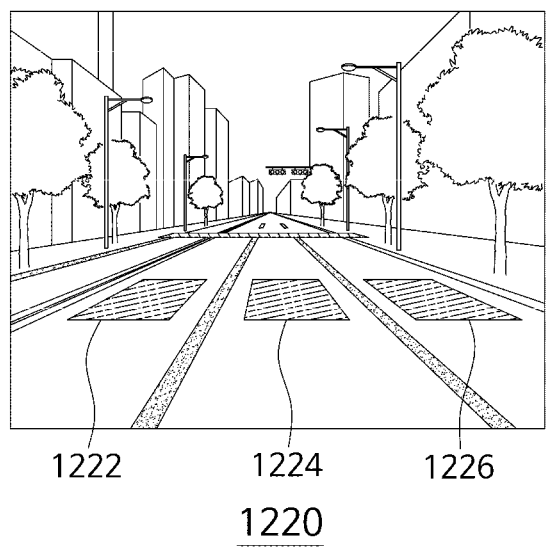
FIG. 12 is an exemplary diagram illustrating a change value map generated based on a captured road image and a projected road-layout map by a system for detecting changes in road information according to another embodiment.
Figure 12:
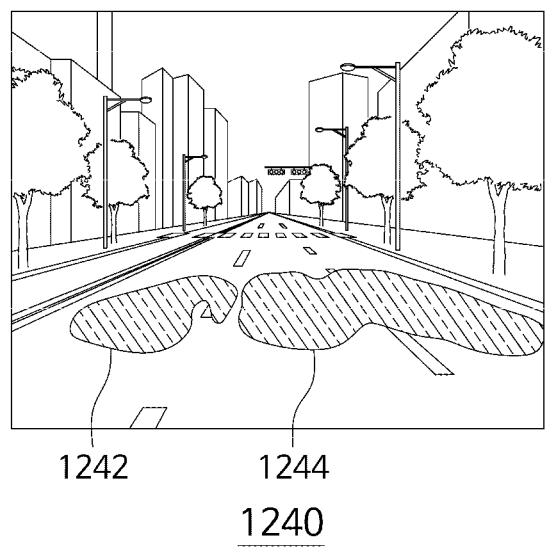

FIG. 12 is an exemplary diagram illustrating a change value map 1240 generated according to the captured road image and the projected road-layout map by the system 180 for detecting changes in road information according to another embodiment.

As illustrated, in the image 1220 in which the captured road image and the projected road-layout map are superimposed, when the previously stored objects 1222, 1224, 1226 are present on the projected road-layout map for a region where there is no road marker displayed on the captured road image, the system 180 for detecting changes in road information may detect the corresponding region as a region of change and generate the change value map 1240 by masking (1242 and 1244) the detected region of change.

In FIGS. 11 and 12 described above, the change value maps 1140 and 1240 only illustrate an example where the object present on the road-layout map is lost from the captured road image or where the object not present on the road-layout map is added, but the present disclosure is not limited thereto. For example, in the corresponding region of a projected road-layout map and a captured road image, when another object other than a previously present object in the projected road-layout map is present in the captured road image, the system 180 for detecting changes in road information may detect the corresponding region as the region of change, and generate the change value map by masking the detected region of change. As another example, when an object detected in a captured road image corresponds to an object that is not defined on the road-layout map, the system 180 for detecting changes in road information may detect the region where the object is detected as the region of change, and generate the change value map by masking the detected region of change.

Figure 13:
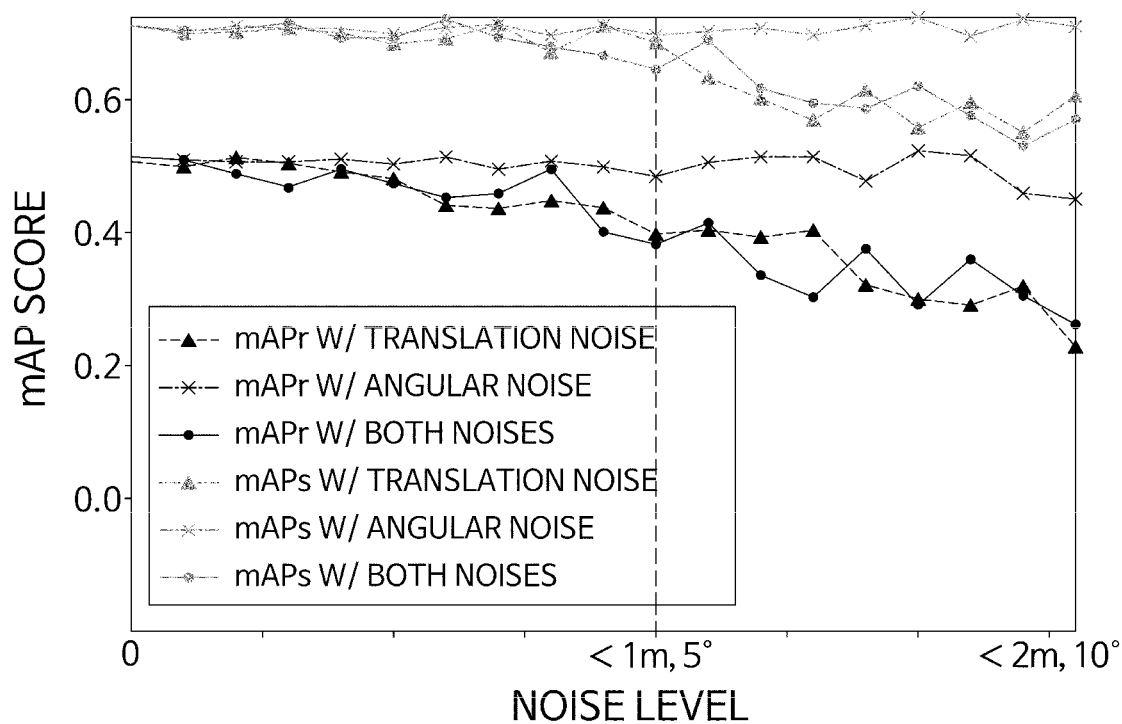
FIG. 13 is a graph illustrating a result of performance of detecting changes in road information of a system for detecting changes in road information according to an embodiment.

FIG. 13 is a graph 1300 illustrating a result of a performance of detecting changes in road information of the system 180 for detecting changes in road information according to an embodiment.

The inventors of the present invention acquired 20,000 captured road images and projected road-layout maps in order to train the system 180 for detecting changes in road information implemented according to the present disclosure. Specifically, in the training of the system 180 for detecting changes in road information, images of road regions without change in urban regions were used, and negative images were artificially generated using the method described above. The encoder 442, the discriminator 444, and the feature extractor 462 included in the system 180 for detecting changes in road information were trained for 30 epochs using Adam solver with an initial learning rate of 0.001 and a batch size of 4. In addition, the change region detector 502 included in the system 180 for detecting changes in road information was trained for 150 epochs with an initial learning rate of 0.0001, and the rest of the hyperparameters were maintained the same. The margin (m) and attenuation level parameter Watt) to be applied to the triplet loss function were set to 0.4 and 0.1, respectively. A random noise in the range of ±1 m and in the range of ±5° at the camera rotation angle was added to the location coordinates of the captured road image or the road-layout map used in training the system 180 for detecting changes in road information.

In order to quantitatively analyze the result using the system 180 for detecting changes in road information of the present disclosure, performance evaluation was basically conducted using the mean average precision score (mAP score). Specifically, mAPr can represent the performance in terms of image retrieval of the system 180 for detecting changes in road information, and can evaluate how well it can perform a comparison between the captured road images and the road-layout maps belonging to different domains from each other. Specifically, mAPr may evaluate the minimum number of times that the system 180 for detecting changes in road information can retrieve for the road-layout map corresponding to a query from the entire road layout map dataset when setting the captured road image as a query. mAPr was calculated by averaging the values over the entire test dataset.

mAPs can represent the performance of the system 180 for detecting changes in road information in terms of change detection, and can evaluate how well it can find the change occurring on the road-layout map. Specifically, the mAPs may evaluate the minimum number of times that the system 180 for detecting changes in road information can retrieve the road-layout map corresponding to a query from the set of artificially generated change maps when setting the captured road image as a query. The mAPs was calculated by averaging values over the entire test dataset.

In order to quantitatively evaluate or analyze the performance of detecting changes in road information of the system 180 for detecting changes in road information, approximately 4,000 captured images and projected road-layout maps for a road region without change in still another urban region were acquired, and an average of 40 artificially changed masks were generated for each image.

TABLE 1

| <PERFORMANCE CHANGE FOR EACH CONFIGURATION> | | |
| --- | --- | --- |
| Configuration | mAPr | mAPs |
| Baseline | 0.37 | 0.60 |
| + Adversarial learning | 0.43 | 0.59 |
| + Attenuated margin | 0.51 | 0.71 |

Table 1 above represents the performance of the baseline (r baseline row) including the metric learning artificial neural network model structure, the performance of the configuration (+ adversarial learning row) further including the adversarial learning artificial neural network model structure in addition to the baseline, and the performance of the configuration (+ attenuation margin row) further including the adversarial learning artificial neural network model structure in addition to the baseline and applying the adaptive margin as the margin of the triplet loss function of the metric learning artificial neural network, as values of the mAPr and the mAPs, respectively, in the system 180 for detecting changes in road information.

The mAPr value was calculated as 0.37 in the baseline, 0.43 in the configuration further including the adversarial learning, and 0.51 in the configuration applying the adaptive margin. According to this performance value, it can be seen that the performance value increases or improves as other configurations are added to the baseline in the system 180 for detecting changes in road information. Meanwhile, the mAPs value was calculated as 0.60 in the baseline, 0.59 in the configuration further including the adversarial learning, and 0.71 in the configuration applying the adaptive margin. Accordingly, it can be seen that the performance is improved when the adaptive margin is applied to the baseline in the system 180 for detecting changes in road information.

In view of these results, it can be seen that, in the system 180 for detecting changes in road information, the configuration (+ adversarial learning) including the adversarial learning artificial neural network in addition to the baseline, and the configuration (+ attenuated margin) applying the adaptive margin to the baseline has more improved performance than the baseline including the metric learning artificial neural network model structure. In particular, since the mAPs are mainly designed to reflect the change detection performance of the system 180 for detecting changes in road information, while mAPr is closely related to the domain adaptation of the system for detecting changes in road information, the advantage of the configuration of adding the adaptive learning artificial neural network is mainly exhibited by the mAPr value.

TABLE 2

| <mAPs SCORES BY EACH TYPE OF CHANGE IN ROAD INFORMATION> | | | |
| --- | --- | --- | --- |
| | Type of Change | | |
| Category | Addition | Removal | Class change |
| Road Lane | — | 0.86 | 0.63 |
| Arrow marker | 0.87 | 0.83 | 0.50 |
| Other road information | 0.91 | 0.90 | 0.57 |

Table 2 above represents mAPs scores for the removal of lanes, change of class; insertion and removal of arrow marker, change of class; addition and removal of other road information and change of class, in the system 180 for detecting changes in road information. According to the values in Table 2, the system 180 for detecting changes in road information according to the present disclosure shows good overall performance in all cases, but Class change of object shows lower performance than Addition and Removal. Accordingly, in detecting changes in road information by the system 180 for detecting changes in road information, it can be seen that the class change of the object is relatively difficult to detect compared to the removal or addition of the object.

FIG. 13 illustrates mAP scores according to noise levels with the graph 1300. Specifically, FIG. 13 is a graph showing mAPr scores and mAPs scores according to noise levels, respectively, when there is noise about the location coordinates of the map data input to the system 180 for detecting changes in road information, or noise about the camera rotation angle, or noise about both the location coordinate and the camera rotation angle. As illustrated in the graph, even when there is noise in the range of ±1 m in the position coordinate and/or noise in the range of ±5° in the camera rotation angle, which is a general error that can occur on the input map data, the system 180 for detecting changes in road information can maintain about 80% of the performance for map data without noise.

FIG. 14 is a flowchart illustrating a method for detecting changes in road information according to an embodiment.

As illustrated, a method 1400 for detecting changes in road information may start at S1420 of converting, by the domain adapter 440, a captured road image and a projected road-layout map into the first intermediate data and the second intermediate data of the same feature space, respectively. For example, by using two encoders 442_1 and 442_2 included in the domain adapter 440, the captured road image and the projected road-layout map may be converted into intermediate data in the form of four-dimensional tensor, respectively. Here, the projected road-layout map may be generated by receiving the location information and the camera parameters of the captured road image from the camera 140 by the map projector 420, receiving the road-layout map corresponding to the location information, which is received from the digital map DB 120, and projecting the received road-layout map onto the image plane of the camera 140 based on the received location information and camera parameters.

According to an embodiment, the captured road image may be converted into the first intermediate data by the first encoder 442_1, and the projected road-layout map may be converted into the second intermediate data by the second encoder 442_2. In addition, the domain difference between the first intermediate data and the second intermediate data may be calculated by the discriminator 444. Here, the first encoder 442_1 and the second encoder 442_2 may be trained to minimize the domain difference calculated by the discriminator 444.

According to another embodiment, the first encoder 442_1 and the second encoder 442_2 of the domain adapter 440 may be trained such that the output value of the discriminator 444 for the first intermediate data is the first value, and the output value of the discriminator for the second intermediate data is the second value, and the discriminator may be trained such that the output value of the discriminator for the first intermediate data is the second value, and the output value of the discriminator for the second intermediate data is the first value.

Thereafter, at S1440, the similarity between the captured road image and the projected road-layout map may be calculated based on the first intermediate data and the second intermediate data by the similarity determiner 460. That is, the similarity determiner 460 may quantify how similar the captured road image and the projected road-layout map are. According to an embodiment, by the metric learning artificial neural network, the features of the captured road image and the projected road-layout map may be extracted based on the first intermediate data and the second intermediate data, and the distance between the extracted features may be calculated as the similarity between the captured road image and the projected road-layout map. The metric learning artificial neural network may be trained to calculate the similarity between the captured road image and the projected road-layout map using the triplet loss function that enforces the similarity between the captured road image and the positive image which is the projected road-layout map corresponding to the captured road image to be greater by a margin than the similarity between the captured road image and the negative image which is the projected road-layout map not corresponding to the captured road image.

According to an embodiment, the margin used herein may be adjusted according to the domain difference between the first intermediate data and the second intermediate data calculated by the domain adapter 440. According to another embodiment, the margin may be adjusted according to the difference between the expected value of the output value of the discriminator 444 for the first intermediate data and the expected value of the output value of the discriminator for the second intermediate data, which is calculated with the domain difference by the domain adapter 440.

In addition, the positive image used to train the metric learning artificial neural network may be generated by adding the random position error to the projected road-layout map corresponding to the captured road image, and the negative image used thereto may be generated by adding, removing, or changing an object in the projected road-layout map corresponding to the captured road image. In the training of the metric learning artificial neural network, an image in which an object-displaying region in either the positive image or the negative image is occluded by a dynamic object in the captured road image may not be used.

Finally, at S1460, it is possible to detect, by the change detector 480, the presence or absence of changes in the road information on the projected road-layout map based on the calculated similarity. According to an embodiment, by the similarity determiner 460, the third intermediate data and the fourth intermediate data may be extracted from the first intermediate data and the second intermediate data, respectively, and by the change region detector 502, the change value map having the same resolution as the captured road image or the projected road-layout map may be extracted based on the third intermediate data and the fourth intermediate data. This change value map may be superimposed on the captured road image or the projected road-layout map and displayed.

FIG. 15 is a flowchart illustrating a method for training an artificial neural network for detecting changes in road information according to an embodiment.

As illustrated, the method 1500 for training an artificial neural network for detecting changes in road information may start at S1520 of training an adversarial learning artificial neural network to perform domain adaptation between the captured road image and the projected road-layout map by converting the captured road image and the projected road-layout map into the first intermediate data and the second intermediate data of the same feature space, respectively.

According to an embodiment, the captured road image may be converted into the first intermediate data by the first encoder 442_1, the projected road-layout map may be converted into the second intermediate data by the second encoder 442_2, and the domain difference between the first intermediate data and the second intermediate data may be calculated by the discriminator 444. Here, the first encoder 442_1 and the second encoder 442_2 may be trained to minimize the domain difference calculated by the discriminator 444.

According to another embodiment, the first encoder 442_1 and the second encoder 442_2 may be trained such that the output value of the discriminator 444 for the first intermediate data is the first value, and the output value of the discriminator for the second intermediate data is the second value, and the discriminator may be trained such that the output value of the discriminator for the first intermediate data is the second value, and the output value of the discriminator for the second intermediate data is the first value. Then, at S1540, the metric learning artificial neural network may be trained to extract the features of the captured road image and the projected road-layout map based on the first intermediate data and the second intermediate data, and calculate the distance between the extracted features as the similarity between the captured road image and the projected road-layout map. According to an embodiment, the metric learning artificial neural network may be trained to calculate the similarity between the captured road image and the projected road-layout map using the triplet loss function that enforces the similarity between the captured road image and the positive image which is the projected road-layout map corresponding to the captured road image to be greater by a margin than the similarity between the captured road image and the negative image which is the projected road-layout map not corresponding to the captured road image. Here, the used margin may be adjusted according to the domain difference between the calculated first intermediate data and the second intermediate data.

In addition, in order to train the metric learning artificial neural network, the positive image may be generated by adding a random position error to the projected road-layout map corresponding to the captured road image, and the negative image may be generated by adding, removing, or changing an object in the projected road-layout map corresponding to the captured road image. An image in which an object-displaying region in either the positive image or the negative image is occluded by a dynamic object in the captured road image may not be used.

Finally, at S1560, based on the calculated similarity, the change detection artificial neural network may be trained to detect the presence or absence of changes in the road information on the projected road-layout map. A dataset for training the artificial neural network trained in each step of the method 1500 for training an artificial neural network for detecting changes in road information may be artificially generated.

In the flowchart illustrated in FIG. 15, although the steps of training each artificial neural network are illustrated to be performed in order, the present disclosure is not limited thereto, and each artificial neural network may be trained in a different order from that of FIG. 15 or may be simultaneously trained.

The method for detecting changes in road information described above may be implemented as a computer-readable code on a computer-readable recording medium. The recording medium may continuously store a program executable by a computer or temporarily store a program for execution or download. In addition, the medium may be a variety of recording means or storage means in a form in which a single piece of hardware or several pieces of hardware are combined, but is not limited to a medium directly connected to any computer system, and may be present on a network in a distributed manner. Examples of media include magnetic media such as hard disks, floppy disks, and magnetic tape, optical media such as CD-ROMs and DVDs, magnetic-optical media such as floptical disks, a ROM, a RAM, a flash memory, and so on, and may be devices configured to store program instructions. In addition, examples of other media also include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer readable medium as one or more instructions or codes, or may be transmitted through a computer readable medium. The computer readable media include both the computer storage media and the communication media including any medium that facilitates the transfer of a computer program from one place to another. The storage media may also be any available media that may be accessed by a computer. By way of non-limiting example, such a computer readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for detecting changes in road information performed by at least one processor of a computer system, the method comprising:
converting, by a domain adapter, a captured road image and a projected road-layout map into first intermediate data and second intermediate data of a same feature space, respectively;
extracting, by a similarity determiner, features of the captured road image and the projected road-layout map based on the first intermediate data and the second intermediate data, and calculating a distance between the extracted features as a similarity between the captured road image and the projected road-layout map; and
detecting, by a change detector, presence or absence of changes in road information on the projected road-layout map based on the calculated similarity,
wherein the similarity determiner includes a metric learning artificial neural network trained to calculate the similarity between the captured road image and the projected road-layout map using a triplet loss function that enforcers a similarity between the captured road image and a positive image, which is the projected road-layout map corresponding to the captured road image, to be larger by a margin than a similarity between the captured road image and a negative image, which is projected road-layout map not corresponding to the captured road image.

2. The method according to claim 1, wherein,
prior to the converting the captured road image and the projected road-layout map into the first intermediate data and the second intermediate data of the same feature space, respectively, receiving location information and camera parameters of the captured road image from a camera;
receiving a road-layout map corresponding to the received location information from a digital map database; and
generating, by a map projector, the projected road-layout map by projecting the received road-layout map onto an image plane of the camera based on the received location information and the received camera parameters.

3. The method according claim 1, wherein the margin is adjusted according to a domain difference between the first intermediate data and the second intermediate data calculated by the domain adapter.

4. The method according to claim 1, wherein the positive image is generated by adding a random position error to the projected road-layout map corresponding to the captured road image, and
the negative image is generated by adding, removing, or changing an object in the projected road-layout map corresponding to the captured road image.

5. The method according to claim 4, wherein, in the training of the metric learning artificial neural network, an image in which an object-displaying region in either the positive image or the negative image is occluded by a dynamic object in the captured road image is not used.

6. The method according to claim 1, wherein the converting of the captured road image and the projected road-layout map into the first intermediate data and the second intermediate data of the same feature space, respectively, includes:
converting, by a first encoder, the captured road image into the first intermediate data;
converting, by a second encoder, the projected road-layout map into the second intermediate data; and
calculating, by a discriminator, a domain difference between the first intermediate data and the second intermediate data, and
the first encoder and the second encoder are trained to minimize the domain difference calculated by the discriminator.

7. The method according to claim 6, wherein the first and second encoders are trained such that an output value of the discriminator for the first intermediate data is a first value, and an output value of the discriminator for the second intermediate data is a second value, and
the discriminator is trained such that the output value of the discriminator for the first intermediate data is the second value, and the output value of the discriminator for the second intermediate data is the first value.

8. The method according to claim 6, wherein
the calculating of the domain difference between the first intermediate data and the second intermediate data includes calculating, by the domain adapter, a difference between an expected value of an output value of the discriminator for the first intermediate data and an expected value of an output value of the discriminator for the second intermediate data as the domain difference, and the margin is adjusted according to the domain difference between the first intermediate data and the second intermediate data calculated by the domain adapter.

9. The method according to claim 1, wherein the calculating of the similarity between the captured road image and the projected road-layout map includes extracting, by the similarity determiner, third intermediate data and fourth intermediate data, respectively, from the first intermediate data and the second intermediate data, and the detecting of the presence or the absence of changes in the road information on the projected road-layout map based on the calculated similarity includes generating, by a change region detector, a change value map having a same resolution as the captured road image or the projected road-layout map based on the third intermediate data and the fourth intermediate data.

10. A method for training an artificial neural network for detecting changes in road information, the method performed by at least one processor of a computer system, the method comprising:

training an adversarial learning artificial neural network to perform domain adaptation between a captured road image and a projected road-layout map by converting the captured road image and the projected road-layout map into first intermediate data and second intermediate data of a same feature space, respectively;

training a metric learning artificial neural network to extract features of the captured road image and the projected road-layout map based on the first intermediate data and the second intermediate data, and calculate a distance between the extracted features as a similarity between the captured road image and the projected road-layout map; and training a change detection artificial neural network to detect presence or absence of changes in road information on the projected road-layout map based on the calculated similarity, wherein the metric learning artificial neural network trained to calculate a similarity between the captured road image and the projected road-layout map using a triplet loss function that enforcers a similarity between the captured road image and a positive image, which is a projected road-layout map corresponding to the captured road image, to be greater by a margin than a similarity between the captured road image and a negative image, which is projected road-layout map not corresponding to the captured road image.

11. The method according to 10, wherein the training of the metric learning artificial neural network includes:

calculating a domain difference between the first intermediate data and the second intermediate data; and adjusting the margin according to the domain difference.

12. The method according to claim 10, wherein the training of the metric learning artificial neural network includes:

generating the positive image by adding a random position error to a projected road-layout map corresponding to the captured road image; and generating the negative image by adding, removing, or changing an object in the projected road-layout map corresponding to the captured road image.

13. The method according to claim 12, wherein the training of the metric learning artificial neural network includes deleting an image in which an object-displaying region either in the positive image or the negative image is occluded by a dynamic object in the captured road image.

14. The method according to claim 10, wherein the training of the adversarial learning artificial neural network includes:

converting, by a first encoder, the captured road image into the first intermediate data;

converting, by a second encoder, the projected road-layout map into the second intermediate data;

calculating, by a discriminator, a domain difference between the first intermediate data and the second intermediate data; and training the first encoder and the second encoder to minimize the domain difference calculated by the discriminator.

15. The method according to claim 14, wherein the training of the adversarial learning artificial neural network includes:

training the first encoder and the second encoder such that an output value of the discriminator for the first intermediate data is a first value, and an output value of the discriminator for the second intermediate data is a second value; and training the discriminator such that the output value of the discriminator for the first intermediate data is the second value, and the output value of the discriminator for the second intermediate data is the first value.

16. A system for detecting changes in road information, comprising:

a domain adapter configured to convert a captured road image and a projected road-layout map into first intermediate data and second intermediate data of a same feature space, respectively, to perform domain adaptation between the captured road image and the projected road-layout map;

a similarity determiner configured to extract features of the captured road image and the projected road-layout map based on the first intermediate data and the second intermediate data, and calculate a distance between the extracted features as a similarity between the captured road image and the projected road-layout map; and a change detector configured to detect presence or absence of changes in road information on the projected road-layout map based on the calculated similarity, wherein the similarity determiner includes a metric learning artificial neural network trained to calculate the similarity between the captured road image and the projected road-layout map using a triplet loss function that enforcers a similarity between the captured road image and a positive image, which is the projected road-layout map corresponding to the captured road image, to be larger by a margin than a similarity between the captured road image and a negative image, which is projected road-layout map not corresponding to the captured road image.

17. The system according to claim 16, further comprising:

a map projector configured to receive location information and camera parameters of the captured road image from a camera, receive a road-layout map corresponding to the received location information from a digital map database, and project the received road-layout map onto an image plane of the camera based on the received location information and the received camera parameters to generate the projected road-layout map.

* * * * *